(12) United States Patent
Candea et al.

(10) Patent No.: US 8,776,026 B2
(45) Date of Patent: Jul. 8, 2014

(54) SYSTEM AND METHOD FOR IN-VIVO MULTI-PATH ANALYSIS OF BINARY SOFTWARE

(75) Inventors: George Candea, Saint-Sulpice (CH); Vitaly Chipounov, Renens (CH); Volodymyr Kuznetsov, Renens (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 329 days.

(21) Appl. No.: 13/251,212

(22) Filed: Oct. 1, 2011

(65) Prior Publication Data
US 2012/0084759 A1 Apr. 5, 2012

Related U.S. Application Data

(60) Provisional application No. 61/388,629, filed on Oct. 1, 2010, provisional application No. 61/405,224, filed on Oct. 21, 2010.

(51) Int. Cl.
*G06F 9/44* (2006.01)
*G06F 11/36* (2006.01)
*G06F 9/455* (2006.01)

(52) U.S. Cl.
CPC ........ *G06F 11/3664* (2013.01); *G06F 9/45504* (2013.01); *G06F 9/45516* (2013.01); *G06F 11/3612* (2013.01); *G06F 11/3636* (2013.01)
USPC .......................................... 717/126; 717/127

(58) Field of Classification Search
CPC ............ G06F 9/45504; G06F 9/45516; G06F 11/3604; G06F 11/3612
USPC .......................................... 717/126, 131, 127
See application file for complete search history.

(56) References Cited

U.S. PATENT DOCUMENTS 8,613,001 B2 * 12/2013 Kong ............................ 719/328
2008/0016250 A1 * 1/2008 Creemer ....................... 709/248

OTHER PUBLICATIONS

Sharif et al., "Impeding Malware Analysis Using Conditional Code Obfuscaltion", 2008.*
Moser et al., "Exploring Multiple Execution Paths for Malware Analysis", 2007.*
Ru-Gang Xu, "Symbolic Execution ALgorithms for Testing Generation", 2009.*
Ashley Saulsbury, "UltraSPARC Virtual Machine Specification", 2008.*
Chen et al., "Path-based Failure and Evolution Management", 2004.*
Gustafsson et al., "The Worst Case Execution Time Tool Challenge", 2006.*
Anderson, J., et al., "Continuous profiling: Where have all the cycles gone?", ACM Transactions on Computer Systems, Nov. 1997, pp. 357-390, vol. 15, No. 4.

(Continued)

*Primary Examiner* — Phillip H Nguyen
(74) *Attorney, Agent, or Firm* — Fenwick & West LLP

(57) ABSTRACT

A system and method for in-vivo multi-path analysis and testing of binary software including binary device drivers is disclosed. The system and method may be used to test a binary software system and may comprise a virtual machine, a symbolic execution engine and a modular plugin architecture. In addition, a device driver testing system is also disclosed wherein symbolic execution may be used to explore the device driver's execution paths and check for device driver behavior.

42 Claims, 15 Drawing Sheets

(56) References Cited

OTHER PUBLICATIONS

Ball, T., et al., "The static driver verifier research platform," In Intl. Conf. On Computer Aided Verification, 2010, 4 Pages.

Ball, T., et al., "Thorough static analysis of device drivers," In ACM SIGOPS/EuroSys European Conf. On Computer Systems, Apr. 18-21, 2006, pp. 73-86.

Bellard, F., "QEMU, a fast and portable dynamic translator," In USENIX Annual Technical Conf., 2005, pp. 41-46.

Bessey, A., et al., "A few billion lines of code later: using static analysis to find bugs in the real world," Communications of the ACM, Feb. 2010, pp. 66-75, vol. 53, No. 2.

The Bochs Project, "The Open Source IA-32 Emulator Project," last modified Jan. 7, 2012, 3 pages, [online] [retrieved on Mar. 22, 2012] Retrieved from the internet <URL:http://bochs.sourceforge.net/>.

Boonstoppel, P., et al., "RWset: Attacking path explosion in constraint-based test generation," In Intl. Conf. On Tools and Algorithms for the Construction and Analysis of Systems, 2008, 16 Pages.

Brumley, D., et al., "BitScope: Automatically dissecting malicious binaries," Technical Report CMU-CS-07-133, Carnegie Mellon University, 2007, 20 pages.

Bungale, P. P., et al., "PinOS: a programmable framework for whole-system dynamic instrumentation," In Intl. Conf. On Virtual Execution Environments, Jun. 13-15, 2007, 11 Pages.

Burrows, M., et al., "Efficient and flexible value sampling," In Intl. Conf. On Architectural Support for Programming Languages and Operating Systems, Nov. 12-15, 2000, pp. 160-167.

Butt, S., et al., "Protecting commodity operating system kernels from vulnerable device drivers," Proceedings of the 25th Annual Computer Security Applications Conf., Dec. 2009, 14 Pages.

Cadar, C., et al., "EXE: Automatically Generating Inputs of Death," In Conf. On Computer and Communication Security, Oct. 30-Nov. 3, 2006, 14 Pages.

Cadar, C., et al., "KLEE: Unassisted and Automatic Generation of High-Coverage Tests for Complex Systems Programs," In Symp. On Operating Systems Design and Implementation, 2008, pp. 1-16.

Castro, M., et al., "Fast byte-granularity software fault isolation," In Symp. on Operating Systems Principles, Oct. 11-14, 2009, 14 Pages.

Chipounov, V., et al., "Reverse engineering of binary device drivers with RevNIC," In ACM SIGOPS/EuroSys European Conf. On Computer Systems, Apr. 13-16, 2010, 14 Pages.

Chipounov, V., et al., "S2E: A Platform for In-Vivo Multi-Path Analysis of Software Systems," ASPLOS'11, Mar. 5-11, 2011, pp. 1-14.

Chipounov, V., et al., "Selective symbolic execution," In Workshop on Hot Topics in Dependable Systems, 2009, 6 Pages.

Chou, A., et al., "An empirical study of operating systems errors," Stanford University, 2001, 16 pages.

Ciortea, L., et al., "Cloud9: A Software Testing Service," Proc. 3rd SOSP Workshop on Large Scale Distributed Systems and Middleware (LADIS), Big Sky, MT, Oct. 2009, pp. 1-6.

Dillig, I., et al., "Sound, complete and scalable path-sensitive analysis," In Conf. on Programming Language Design and Implementation, Jun. 7-13, 2008, 11 Pages.

DTrace, "DTrace (Dynamic Tracing) Community," last modified by Brendan Gregg on Feb. 22, 2011, 1 page [online] [retrieved on Mar. 22, 2012] retrieved from the internet <URL:http://hub.opensolaris.org/bin/view/Community+Group+dtrace/>.

Dunlap, G. W., et al., "Execution replay for multiprocessor virtual machines," In Intl. Conf. on Virtual Execution Environments, Mar. 5-7, 2008, 10 Pages.

Erlingsson, Ú., et al., "XFI: Software guards for system address spaces," In Symp. on Operating Systems Design and Implementation, 2006, pp. 1-14.

Ganapathi, A., et al., "Windows XP kernel crash analysis," In USENIX 20th Large Installation System Administration Conf., 2006, pp. 149-159.

Godefroid, P., et al., "Automated Whitebox Fuzz Testing," In Network and Distributed System Security Symposium, 2008, 16 Pages.

Godefroid, P., "Compositional Dynamic Test Generation," In Symp. on Principles of Programming Languages, Jan. 17-19, 2007, 8 Pages.

Godefroid, P., et al., "DART: Directed Automated Random Testing," In Conf. on Programming Language Design and Implementation, Jun. 12-15, 2005, 11 Pages.

Godefroid, P., "Model Checking for Programming Languages using VeriSoft," Proceedings of the 24th ACM Symposium on Principles of Programming Languages, Paris, Jan. 1997, 14 Pages.

Herder, J. N., et al., "Fault isolation for device drivers," In Intl. Conf. on Dependable Systems and Networks, 2009, 10 Pages.

Hoglund, G., et al., "Rootkits: subverting the Windows Kernel," Campus Press, Addison Wesley Professional, Jul. 22, 2005, 474 Pages.

Kadav, A., et al., "Tolerating hardware device failures in software," In Symp. On Operating Systems Principles, 2009, pp. 1-16.

King, S. T., et al., "Debugging operating systems with time-traveling virtual machines," In USENIX Annual Technical Conf., 2005, pp. 1-15.

King, J. C., "Symbolic execution and program testing," Communications of the ACM, Jul. 1976, pp. 385-394, vol. 19, No. 7.

Kuznetsov, V., et al., "Testing Closed-Source Binary Device Drivers with DDT," Proceedings of the USENIX Annual Technical Conference, Boston, MA, Jun. 2010, pp. 1-14.

Lablua, "Lua: A lightweight embeddable scripting language," 2010, last updated Feb. 16, 2012, 3 pages, [online] [retrieved on Mar. 22, 2012] Retrieved from the internet <URL:http://www.lua.org/about.html>.

Lam, M. S., et al., "Context-sensitive program analysis as database queries," In Symp. on Principles of Database Systems, 2005, 12 Pages.

Lattner, C., et al., "LLVM: A compilation framework for lifelong program analysis & transformation," In Intl. Symp. on Code Generation and Optimization, 2004, 12 Pages.

Luk, C.-K., et al., "Pin: building customized program analysis tools with dynamic instrumentation," In Conf. on Programming Language Design and Implementation, Jun. 12-15, 2005, 11 Pages.

Mérillon, F., et al., "Devil: An IDL for hardware programming," In Symp. on Operating Systems Design and Implementation, 2000, 14 Pages.

Microsoft, "Microsoft security advisory (944653): Vulnerability in Macrovision SECDRV.SYS Driver on Windows Could Allow Elevation of Privilege," Security TechCenter, Nov. 5, 2007, 1 Page, [online] [retrieved on Mar. 22, 2012] Retrieved from the internet <URL:http://technet.microsoft.com/en-us/security/advisory/944653>.

Microsoft, "Windows Hardware Development," 2 pages, [online] [retrieved on Mar. 22, 2012] Retrieved from the internet <http://msdn.microsoft.com/en-us/windows/hardware/default.aspx>.

Murphy, B., "Automating software failure reporting," ACM Queue, Nov. 2004, pp. 42-48, vol. 2, No. 8.

Murphy, C., et al., "Quality assurance of software applications using the in vivo testing approach," In Intl. Conf. on Software Testing Verification and Validation, 2009, pp. 1-10.

Musuvathi, M., et al., "Finding and reproducing Heisenbugs in concurrent programs," In 8th USENIX Symp. on Operating Systems Design and Implementation, 2008, pp. 267-280.

NASA AMES Research Center, "Java Path Finder," Oct. 30, 2007, Last modified Mar. 26, 2012, 2 Pages, [online] [retrieved on Mar. 30, 2012] Retrieved from the internet <URL:http://babelfish.arc.nasa.gov/trac/jpf>.

Open Systemc Initiative, "SystemC 2.0.1 language reference manual (Revision 1.0)," 2003, pp. i-vi, 1-422, can be retrieved at <URL:http://standards.ieee.org/getieee/1666/>.

Orgovan, V., et al., "An introduction to driver quality," Microsoft Windows Hardware Engineering Conf., 2003, 19 Pages.

Păsăreanu, C., et al., "Combining unit-level symbolic execution and system-level concrete execution for testing NASA software," In Intl. Symp. on Software Testing and Analysis, Jul. 20-24, 2008, 11 Pages.

Pesterev, A., et al., "Locating cache performance bottlenecks using data profiling," In ACM SIGOPS/EuroSys European Conf. On Computer Systems, Apr. 13-16, 2010, pp. 1-14.

Savage, S., et al., "Eraser: a dynamic data race detector for multithreaded programs," ACM Transactions on Computer Systems, Nov. 1997, pp. 391-411, vol. 15, No. 4.

Schwarz, B., et al., "Disassembly of executable code revisited," In Working Conf. on Reverse Engineering, 2002, pp. 1-10.

(56) References Cited

OTHER PUBLICATIONS

Seltzer, M., et al., "Dealing with disaster: Surviving misbehaved kernel extensions," In Symp. on Operating Systems Design and Implementation, 1996, 15 Pages.

Sen, K., "Concolic testing," In Intl. Conf. on Automated Software Engineering, Nov. 5-9, 2007, pp. 571-572.

Sen, K., et al., "CUTE: a concolic unit testing engine for C," In Symp. on the Foundations of Software Eng., Sep. 5-9, 2005, 10 Pages.

Song, D., et al., "BitBlaze: A new approach to computer security via binary analysis," In Intl. Conf. on Information Systems Security, LNCS 5352, 2008, pp. 1-25.

Sourceforge.Net, "OProfile," 2 pages, [online] [retrieved on Mar. 22, 2012] Aug. 12, 2011, Retrieved from the internet <URL:http://oprofile.sourceforge.net/about/>.

Srinivasan, S. M., et al., "Flashback: a lightweight extension for rollback and deterministic replay for software debugging," In USENIX Annual Technical Conf., 2004, 15 Pages.

Swift, M. M., et al., "Improving the reliability of commodity operating systems," ACM Transactions on Computer Systems, 2005, pp. 1-33, vol. 23, No. 1.

Swift, M. M., et al., "Recovering device drivers," ACM Transactions on Computer Systems, 2006, 15 Pages, vol. 24, No. 4.

Valgrind™ Developers, "About Valgrind," 2000-2011, 3 pages, [online] [retrieved on Mar. 22, 2012] Retrieved from the internet <URL:http://valgrind.org/info/about.html>.

Wahbe, R., et al., "Efficient software-based fault isolation," In Symp. on Operating Systems Principles, 1993, 14 Pages.

Wheeler, D., "SLOCCount," 2010, 5 pages, [online] [retrieved on Mar. 22, 2012] Retrieved from the internet <URL:http://www.dwheeler.com/sloccount/>.

Xin, B., et al., "Efficient program execution indexing," In Conf. on Programming Language Design and Implementation, Jun. 7-13, 2008, pp. 238-248.

Yang, J., et al., "Explode: a lightweight, general system for finding serious storage system errors," In Symp. on Operating Systems Design and Implementation, 2006, 16 Pages.

Yang, J., et al., "MODIST: Transparent model checking of unmodified distributed systems," $6^{th}$ USENIX Symp. on Networked Systems Design and Implementation, 2009, pp. 213-228.

Yourst, M. T., "PTLsim: A cycle accurate full system x86-64 microarchitectural simulator," In IEEE Intl. Symp. on Performance Analysis of Systems and Software, 2007, pp. 23-34.

Zhang, J., "A path-based approach to the detection of infinite looping," In Asia-Pacific Conf. on Quality Software, 2001, pp. 88-94.

Zhou, F., et al., "SafeDrive: safe and recoverable extensions using language-based techniques," In Symp. on Operating Systems Design and Implementation, Nov. 6-8, 2006, 16 Pages.

\* cited by examiner

| EVENT 502 | TASK CARRIED OUT 504 |
|---|---|
| MultiPathOn() | TURN ON MULTI-PATH EXECUTION |
| MultiPathOff() | TURN OFF MULTI-PATH EXECUTION |
| ReadMem(Addr) | READ CONTENTS OF MEMORY AT ADDRESS ADDR |
| WriteMem(Addr, Val) | WRITE VAL (SYMBOLIC/CONCRETE) TO ADDR |
| ReadReg(Reg) | READ CONTENTS OF REGISTER REG |
| WriteReg(Reg, Val) | WRITE VAL (SYMBOLIC OR CONCRETE) TO REG |
| GetCurrTransBlock() | CURRENTLY EXECUTING CODE BLOCK FROM DBT |
| InjectInterrupt(IRQ) | ASSERT THE INTERRUPT LINE FOR IRQ |
| GetMyPathState() | GET CALLING PLUGIN'S PER-PATH STATE OBJECT |

TABLE 1: SUBSET OF THE EXECSTATE OBJECT'S INTERFACE 500

| EVENT 502 | TASK CARRIED OUT 504 |
|---|---|
| OnInstrTranslation | DBT IS ABOUT TO TRANSLATE AN INSTRUCTION |
| OnInstrExecution | VM IS ABOUT TO EXECUTE AN INSTRUCTION |
| OnExecutionFork | S²E IS ABOUT TO FORK EXECUTION |
| OnException | THE VM INTERRUPT PIN HAS BEEN ASSERTED |

TABLE 2: CORE EVENTS EXPORTED BY THE S²E PLATFORM 550

FIGURE 5

| USE CASE 702 | DEVELOPMENT TIME 704 [PERSON-HOURS] | | TOOL COMPLEXITY 706 [LINES OF CODE] | |
|---|---|---|---|---|
| | FROM SCRATCH | WITH S²E | FROM SCRATCH | WITH S²E |
| TESTING OF PROPRIETARY DEVICE DRIVERS | 2,400 | 38 | 47,100 | 720 |
| REVERSE ENGINEERING OF CLOSED-SOURCE DRIVERS | 3,000 | 41 | 57,009 | 580 |
| MULTI-PATH IN-VIVO PERFORMANCE PROFILING | N/A | 20 | N/A | 767 |

COMPARATIVE PRODUCTIVITY WHEN BUILDING ANALYSIS TOOLS FROM SCRATCH (I.E., WITHOUT S²E) VS. USING S²E 700

FIGURE 7

| TESTED DRIVER 1102 | SIZE OF DRIVER BINARY FILE 1104 | SIZE OF DRIVER CODE SEGMENT 1106 | NUMBER OF FUNCTIONS IN DRIVER 1108 | NUMBER OF CALLED KERNEL FUNCTIONS 1110 | SOURCE CODE AVAILABLE? 1112 |
|---|---|---|---|---|---|
| INTEL PRO/1000 | 168 KB | 120 KB | 525 | 84 | NO |
| INTEL PRO/100 (DDK) | 70 KB | 61 KB | 116 | 67 | YES |
| INTEL 82801AA AC97 | 39 KB | 26 KB | 132 | 32 | NO |
| ENSONIQ AUDIOPCI | 37 KB | 23 KB | 216 | 54 | NO |
| AMD PCNET | 35 KB | 28 KB | 78 | 51 | NO |
| RTL8029 | 18 KB | 14 KB | 48 | 37 | NO |

CHARACTERISTICS OF WINDOWS DRIVERS USED TO EVALUATE DDT 1100

FIGURE 11

| TESTED DRIVER 1202 | BUG TYPE 1204 | DESCRIPTION 1206 |
|---|---|---|
| RTL8029 | RESOURCE LEAK | DRIVER DOES NOT ALWAYS CALL NDISCLOSE CONFIGURATION WHEN INITIALIZATION FAILS |
| RTL8029 | MEMORY CORRUPTION | DRIVER DOES NOT CHECK THE RANGE FOR MAXIMUM MULTICAST LIST REGISTRY PARAMETER |
| RTL8029 | RACE CONDITION | INTERRUPT ARRIVING BEFORE TIMER INITIALIZATION LEADS TO BSOD |
| RTL8029 | SEGMENTATION FAULT | CRASH WHEN GETTING AN UNEXPECTED OID IN QUERY INFORMATION |
| RTL8029 | SEGMENTATION FAULT | CRASH WHEN GETTING AN UNEXPECTED OID IN SET INFORMATION |
| AMD PCNET | RESOURCE LEAK | DRIVER DOES NOT FREE MEMORY ALLOCATED WITH NDIS-ALLOCATE MEMORY WITH TAG |
| AMD PCNET | RESOURCE LEAK | DRIVER DOES NOT FREE PACKETS AND BUFFERS ON FAILED INITIALIZATION |
| ENSONIQ AUDIOPCI | SEGMENTATION FAULT | DRIVER CRASHES WHEN EX-ALLOCATE POOL WITH TAG RETURNS NULL |
| ENSONIQ AUDIOPCI | SEGMENTATION FAULT | DRIVER CRASHES WHEN PCNEW INTERRUPT SYNC FAILS |
| ENSONIQ AUDIOPCI | RACE CONDITION | RACE CONDITION IN THE INITIALIZATION ROUTINE |
| ENSONIQ AUDIOPCI | RACE CONDITION | VARIOUS RACE CONDITIONS WITH INTERRUPTS WHILE PLAYING AUDIO |
| INTEL PRO/1000 | MEMORY LEAK | MEMORY LEAK ON FAILED INITIALIZATION |
| INTEL PRO/100 (DDK) | KERNEL CRASH | KE RELEASE SPIN LOCK CALLED FROM DPC ROUTINE |
| INTEL 82801AA AC97 | RACE CONDITION | DURING PLAYBACK, THE INTERRUPT HANDLER CAN CAUSE A BSOD |

SUMMARY OF PREVIOUSLY UNKNOWN BUGS DISCOVERED BY DDT 1200

FIGURE 12

SYSTEM AND METHOD FOR IN-VIVO MULTI-PATH ANALYSIS OF BINARY SOFTWARE

CLAIM OF PRIORITY

This utility patent application claims priority from and incorporates by reference two previously filed provisional patent applications: (1) Application No. 61/388,629, titled "Testing Closed-Source Binary Device Drivers with DDT" filed on Oct. 1, 2010 and (2) Application No. 61/405,224, titled "S2E: A Platform for In-Vivo Multiple-Path Analysis of Software Systems" filed on Oct. 21, 2010.

FIELD OF TECHNOLOGY

This disclosure relates generally to the technical field of software testing and, in one example embodiment, to a system and method for in-vivo multi-path analysis and testing of binary software including binary device drivers.

BACKGROUND

System developers routinely need to analyze the behavior of the software systems they build. One basic analysis is to understand observed behavior, such as why a Web server is slow, for example, on a Standard Performance Evaluation Cooperation web benchmark. More sophisticated analysis aims to characterize future behavior in previously unseen circumstances, such as what will a Web server's maximum latency and minimum throughput be, once deployed at a customer site. Ideally, system designers would also like to be able to do quick "what-if" analyses, such as determining whether aligning a certain data structure on a page boundary will avoid all cache misses. For small programs, experienced developers can often reason through some of these questions based on code alone. However, there currently exists no platform that is able to answer such questions for large, complex, and real systems.

Such a platform would need to enable easy construction of tools like oprofile, valgrind, bug finders, reverse engineering tools and simultaneously have the following three key properties: (1) be able to efficiently analyze entire families of execution paths; (2) maximize realism by running the analyses within a real software stack; and (3) be capable of handling binaries. There is no practical tool today that can provide all three of these properties together, so system builders often have to resort to guesswork and extrapolation.

First, predictive analyses must measure entire families of paths through the target system, whereas existing tools can measure only one path at a time. Reasoning about families of paths is key to predicting behavior; ultimately, properties that can be shown to hold for all paths Constitute proofs—the ultimate prediction. Security analysis also requires reasoning about all execution paths through the program, to ensure that desired security policies cannot be violated even in corner cases. These are all multi-path (i.e., symbolic) performance envelopes for programs, instead of profiling performance solely along one path. Not only are such analyses of interest for real-time requirements (e.g., to ensure that an interrupt handler can never exceed an upper bound in execution time), they are also useful for capacity planning (e.g., to determine how many web servers to provision for a web farm). A powerful multi-path analyzer could also automatically generate worst-case and best-case workloads for programs.

Second, an accurate estimate of program behavior often requires taking into account the whole environment surrounding the analyzed program: libraries, kernel, drivers and central processing unit (CPU) architecture, in other words, in-vivo analysis, program analysis which captures all interactions of the analyzed code with its surrounding system, and not only with a simplified abstraction of that system. Even small programs interact with their environment (libraries, operating systems, etc.), e.g., to read/write files or network packets, so understanding the behavior of the program requires understanding the nature of these interactions. Current approaches either abstract away this environment behind a model, or execute the real environment but allow calls from different execution paths to clobber each other's state. Writing abstract models is labor-intensive, taking in some cases multiple persons years, and practically always results in an incomplete and/or inaccurate model; maintaining the accuracy of these models in the face of the evolution of the modeled system is even more challenging. Therefore it is necessary to allow analyzed programs to interact consistently with the real environment during multi-path analyses. A common form of in vivo analysis occurs when testing large programs, like Mozilla Firefox, when one typically wants to focus attention on a particular area of the code, such as a module that is known to deadlock, or code that was recently added or modified—the rest of the system becomes "the environment."

Third, real systems are made up of many components from various vendors; access to all corresponding source code is rarely feasible and, even if it is, building the code exactly as in the shipped software product is difficult. Thus, analysis needed to operate directly on binaries is a requirement that is often very expensive. The first and foremost challenge in performing analysis that are both in-vivo and multi-path is scalability. Going from single-path analysis to multi-path analysis is itself expensive because the number of paths through a program increases exponentially with the number of branches; this is known as the path explosion problem. For this reason, state-of-the-art symbolic execution engines can barely handle programs with a few KLOC (one thousand lines of code), because the cost in terms of memory and exploration time is generally exponential compared to the size of the program. For in-vivo multi-path analysis to be consistent, one would need to symbolically execute the programs, libraries, OS kernel, drivers; even the CPU and devices would have to be simulated. With today's tools, this is not feasible.

In addition, device drivers are one of the least reliable parts of an OS kernel. Drivers and other extensions—which comprise, for instance, 70% of the Linux operating system—have a reported error rate that is 3-7 times higher than the rest of the kernel code, making them substantially more failure-prone. Moreover, some drivers are vulnerable to malformed input from untrusted user-space applications, allowing an attacker to execute arbitrary code with kernel privilege.

It is therefore ironic that most computer users place full trust in binary device drivers: they run drivers inside a kernel at the highest privilege levels, yet enjoy a false sense of safety by purchasing anti-virus software and personal firewalls. Device driver flaws are more dangerous than application vulnerabilities, because device drivers can subvert the entire system and, by having direct memory access, can be used to overwrite both kernel and application memory. As of now, there exist several tools and techniques that can be used to build more reliable drivers or to protect the kernel from misbehaving drivers, but these are primarily aimed at developers who have the driver's source code. Therefore, these techniques cannot be used (or even adapted) for the use of consumers of closed-source binary drivers.

The availability of consumer-side testing of device drivers is essential. As of 2004, there were 800,000 different kinds of plug and play (PnP) devices at customer sites, with 1,500 devices being added every day. There were 31,000 unique drivers, and 9 new drivers were released every day. Each driver had approximately 3.5 versions in the field, with 88 new driver versions being released every day. Faced with an increasing diversity of drivers, consumers (end users and IT specialists alike) feel the need to figure out a way to perform end-to-end testing just before installation.

Black-box testing of closed-source binary device drivers and other device drivers is difficult and typically has low code coverage. This has two main reasons. First, it is hard to exercise the driver through many layers of software stack that lie between the driver's interface and the application interface. Second, closed-source programs are notoriously hard to test as a black box. The classic approach to testing such drivers is to try to produce inputs that exercise as many paths as possible and (perhaps) check for high level properties (e.g., absence of kernel crashes) during those executions. Considering the wide range of possible inputs and system events that are hard to control (e.g., interrupts), this approach exercises relatively few paths, thus offering fewer opportunities to find bugs.

SUMMARY

Disclosed is a system and method for in-vivo multi-path analysis and testing of binary software including binary device drivers. In one aspect, the software analysis system comprises a virtual machine, a symbolic execution engine and a modular plugin architecture. The software analysis system may further comprise a data-based path selection, a code-based path selection, a priority-based path selection and a user-specified custom path selection.

Also disclosed is a system of analyzing binary software which includes a symbolic execution engine to perform multi-path analysis binary software in addition to automatic bidirectional data conversion to switch between a symbolic value and a concrete value. This system enables execution of a concrete to symbolic transition and a symbolic to concrete transition and also allows for several execution consistency models to enable performance tradeoff and/or precision tradeoff.

Also part of the software testing system is a symbolic execution engine comprising a symbolic execution tree which may further comprise a superposition of executions paths. The symbolic execution engine may perform a multi-path analysis of the binary software such that it may executes and may analyze the binary software without modeling its surrounding environment such as an operating system kernel. It may perform a multi-path analysis of the binary software such that it may combine elasticity with virtualization by only executing a library and the operating system kernel. In addition, the execution consistency model may one of the following execution consistency models: CFG consistency, an overapproximate consistency, a local consistency, an overconstrained consistency and a strict consistency.

It may be that the local consistency model may further comprise excluding an execution path that is incompatible with the contract imposed by the interface between a concrete domain and a symbolic domain. The strict consistency model may further comprise excluding an execution path that is not consistent with the operation of the concrete domain. The overconstrained consistency model may further comprise only the execution path in the concrete domain for every choice of a representative of an equivalence class in the symbolic domain. The overapproximate consistency model may be implemented such that effects of the concrete domain may be converted into an unconstrained symbolic data. Finally, the system may comprise implementing the strict consistency via an incremental symbolic execution of the concrete domain to preserve execution consistency.

Also disclosed is a method of analyzing a binary software. This method may include analyzing multiple execution paths using symbolic execution and executing the binary software along multiple execution paths. Further analysis may be performed on multiple execution paths within the software system by operating directly on the binary software by combining virtualization with dynamic binary translation. This would result in a multi-path (i.e., symbolic) analysis of the binary software.

It will be appreciated that the method may comprise a selective symbolic execution to execute the binary software along multiple execution paths to check for undesired properties of the binary software. A failure of the binary software may be detected along multiple execution paths by checking whether the binary software has permission to access a resource region and tracking multiple resource regions to determine which resource region was granted to the binary software and which resource region was revoked from the binary software. The resource region may comprise a dynamically allocated memory, a buffer passed to the closed-source binary driver, a global kernel variable, a current closed-source binary driver stack, an executable image area, a hardware-related memory area or an input/output port range.

The method of analyzing a binary software may also comprise executing the binary software by implementing the selective symbolic execution when a kernel calls an entry point of a binary software for transfer of a system state between a concrete phase of execution and a symbolic phase of execution by converting data going into the entry point from a concrete value to a symbolic value according to an annotation. The annotation may be one of the following: a concrete-to-symbolic conversion hint, a symbolic-to-concrete conversion hint, a resource allocation hint or a kernel crash handler hook.

The concrete-to-symbolic conversion hint may apply to the binary device driver's entry point argument and to values returned by a kernel function called by the binary device driver. The symbolic-to-concrete conversion hint may specify an allowed set of values for arguments to a kernel function called by the binary device driver. The resource allocation hint may specify whether invoking the binary device driver's entry point and calling the kernel function may grant the binary device driver's access to a resource region. The resource allocation hint may specify whether invoking the binary device driver's entry point and calling the kernel function revokes the binary device driver's access to the resource region.

The method may comprise executing the binary software by producing a symbolic interrupt and to further produce the symbolic value upon reading from at least one of a symbolic hardware register and DMA memory. It may also comprise producing a collection of traces of multiple execution paths leading to the failures and information to replay the execution path allowing for the reproduction of the failures on a virtual machine or a physical machine. In addition, a simultaneous access to the plurality of execution paths by the selective symbolic execution may enable the detection of an infinite loop. It is important to note that the method may comprise a modular plugin architecture and a verification tool. It may also comprise an on-demand concretization such that the symbolic value that is not accessed is not concretized.

Furthermore, a method of implementing a binary device driver testing is also disclosed. This method may comprise implementing a virtual machine and a symbolic execution engine to perform a symbolic execution of the binary device driver. The binary driver may then be executed and injected with a symbolic value. A hardware descriptor for a fake device to trick an operating system into loading the binary device driver to be tested may also be provided. Finally, multiple driver entry points of the binary device driver may be automatically detected by monitoring attempts of the binary device driver to register multiple driver entry points with a kernel.

The fake device may be an empty shell comprising a descriptor containing a vendor identification, device identification and a resource information. The machine emulator may be a modified QEMU (i.e., a modified processor emulator that may rely on dynamic binary translation to achieve a reasonable speed while being easy to port on new host CPU architectures) machine emulator. Similarly, the symbolic execution engine may be a modified Klee (i.e., a modified symbolic virtual machine built on top of a low level virtual machine compiler infrastructure, and available under an open source license) symbolic execution engine.

The back-end of the modified QEMU machine emulator may be extended to generate a LLVM bitcode such that the modified QEMU machine emulator may translates a basic block from a guest central processing unit instruction set to a QEMU-specific intermediate representation and then to LLVM. The LLVM bitcode may be directly interpreted by the modified Klee symbolic execution engine. The modified QEMU machine emulator may run in a loop that may repeatedly fetch a guest code block, translate the guest code block, and may run the guest code block in a host central processing unit or the Klee symbolic execution engine.

Furthermore, also disclosed is a method of implementing performance analysis of the binary software comprising by implementing a virtual machine and a symbolic execution engine to perform a symbolic execution of the binary software and executing the binary software and injecting one or more symbolic values. The method also includes providing an emulation of a memory hierarchy and automatically counting the occurrences of machine events.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a tabular representation of a subset of the ExecState object's interface and the core events exported by the $S^2E$ platform, according to one or more embodiments.

FIG. 7 is a tabular representation that shows the comparative productivity of $S^2E$ over building analysis tools from scratch, according to one or more embodiments.

FIG. 11 illustrates the characteristics such as, but not limited to, size of binary file and number or called kernel functions of Windows® drivers used to evaluate DDT, according to one or more embodiments.

FIG. 12 illustrates a summary of previously unknown bugs discovered by DDT, according to one or more embodiments.

Figure 1:
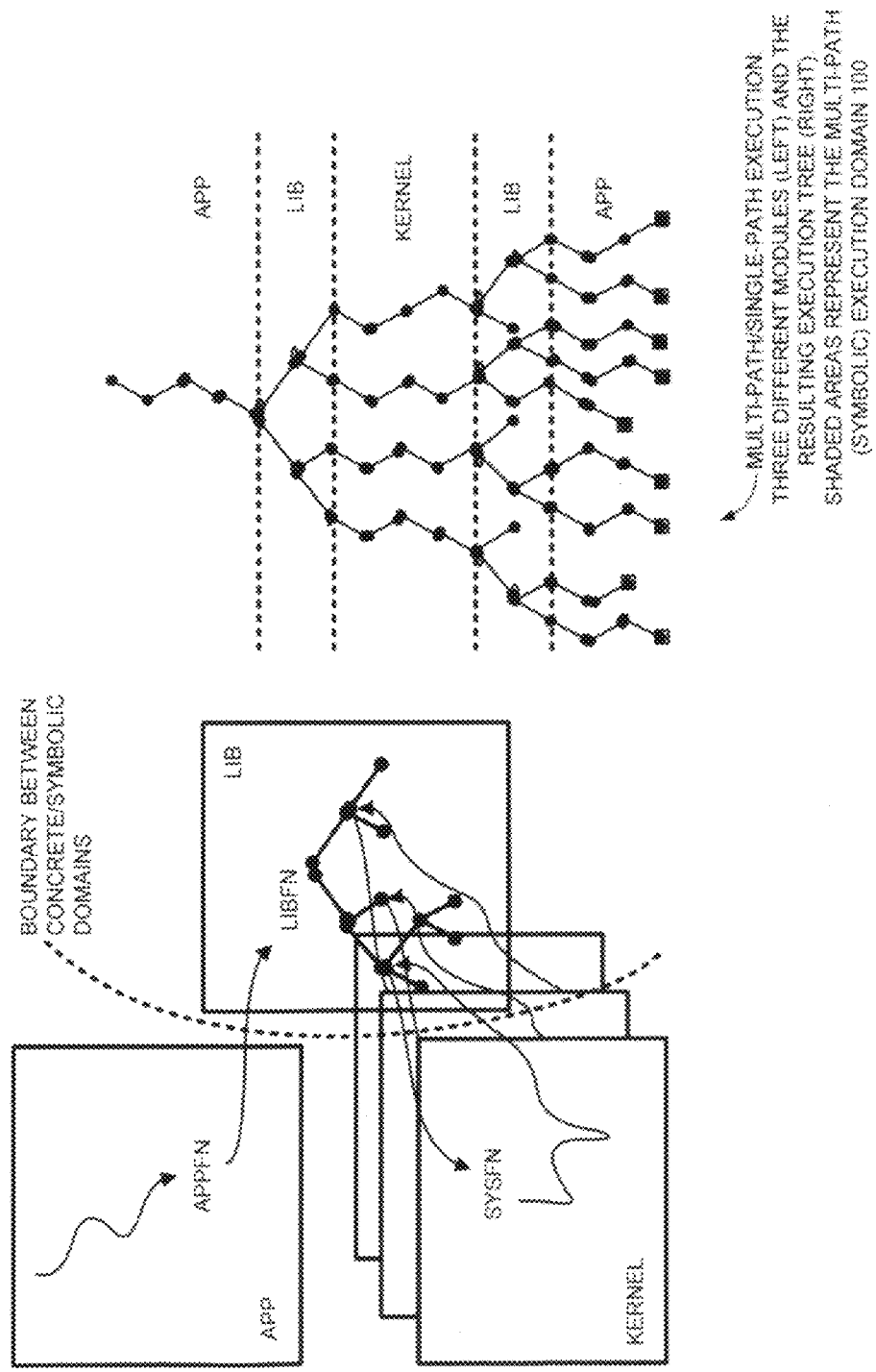
FIG. 1 illustrates multi-path/single path execution and illustrates three different modules and the resulting execution tree.

Other features of the present embodiments will be apparent from accompanying Drawings and from the Disclosure that follows.

DESCRIPTION OF THE EMBODIMENTS

A system and method of in-vivo multi-path analysis of binary software is disclosed. Also disclosed is an implementation of the disclosed system and method to test binary device drivers. In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

$S^2E$ is a general platform for in-vivo multi-path analysis of system behavior which may be used for diverse purposes, such as performance profiling, reverse engineering of proprietary software, and bug finding in both kernel-mode and user-mode binaries. According to one or more embodiments, $S^2E$ may have three key properties: (1) it may simultaneously analyze entire families of execution paths, instead of just one execution at a time; (2) it may run the analysis within the real software stack (user programs, libraries, kernel, drivers, etc.) instead of relying on abstract models of these layers; and (3) it may operate directly on binaries, thus being able to analyze even proprietary software.

According to one or more embodiments, $S^2E$ may provide an automated path explorer and modular path analyzers: the explorer drives in parallel the target system down all execution paths of interest, while analyzers collect information along each path (e.g., count page faults) and/or check higher level properties (e.g., detect race conditions). Desired paths may be specified in many ways: all paths that touch a specific memory object, paths influenced by a specific parameter, or paths inside a target module. Developers may glue together $S^2E$ analyzers to do their analysis, or write new analyzer(s) using the $S^2E$ Application Programming Interface (API). $S^2E$ may be used out-of-the-box for a variety of analyses because it includes several default selectors and analyzers, along with a configuration file and a command-line utility. In a typical usage scenario and according to one embodiment, the $S^2E$ user may define in a configuration file the desired selector(s) and analyzer(s) along with the corresponding parameters, starts up the desired software stack inside the $S^2E$ virtual machine (VM), and may run the $S^2E$ launcher in the guest OS, which starts the desired application and communicates with the $S^2E$ VM underneath.

$S^2E$ is may prove easy to use. For example, a user may want to verify the code that handles license keys in a proprietary program, such as Adobe™ Photoshop™. According to one embodiment, the user may install the program in the $S^2E$ Windows™ VM, may update a $S^2E$ configuration file, and may launch the program using s2e.exe c:\program files\adobe\photoshop. From inside the guest operating system (OS), the s2e.exe launcher may communicate with $S^2E$ via custom opcodes. In the $S^2E$ configuration file, the tester may choose a data race detector analyzer along with a Windows™ registry selector, which the user may configure to return a 12-character symbolic string whenever Photoshop™ reads hkey local machine\software\Photoshop\LicenseKey from the Windows™ registry. $S^2E$ may automatically explore the code paths in Photoshop™ that may be influenced by the value of the license key, and may look for bugs with the data race analyzer, according to one or more embodiments.

Developing a new analysis tool with $S^2E$ may take about 20-40 hours. To illustrate $S^2E$'s generality, three very different tools built using $S^2E$ may be presented: a multi-path performance profiler, a reverse engineering tool, and an automated testing tool. $S^2E$ may enable a wide spectrum of sophisticated analyses, including various forms of bug finding, benchmarking, performance analyses, automated debugging, and dynamic failure analysis. Four major contributions are made here: a general platform for performing diverse in-vivo multi-path analyses in a way that scales to large real systems, definition of automatic bidirectional symbolic-concrete conversions that enable execution to seamlessly and correctly weave back and forth between symbolic and concrete mode, definition of execution consistency models, a systematic way to reason about the tradeoffs involved in the approximation of paths when using mixed concrete/symbolic execution, and the first use of symbolic execution for performance analysis, according to one or more exemplary embodiments.

A selective symbolic execution may be used in one or more embodiments to test the binary software. In devising a way to efficiently exercise entire families of paths, the use of successful symbolic execution in automated software testing may be useful. Symbolic execution engine treats a program as a superposition of possible execution paths. For example, a program that is all linear code except for one conditional statement if (x>0) then . . . else . . . may be viewed as a superposition of two possible paths: one for x>0 and another one for x≤0. To exercise all paths, it may not be necessary to try all possible values of x, but rather just one value greater than 0 and one value less than 0, according to one or more embodiments.

According to one embodiment, $S^2E$ may unfurl this superposition of paths into a symbolic execution tree, in which each possible execution corresponds to a path from the root of the tree to a leaf corresponding to a terminal state. The mechanics of doing so may consist of marking variables as symbolic at the beginning of the program, i.e., instead of allowing a variable x to take on a concrete value 5, it is viewed as a superposition λ of all possible values x could take. Then, any time a branch with predicate p is encountered, execution is split into two executions $E_i$ and $E_k$, two copies of the program state are created, and path $E_i$ remembers that the variables involved in p must be constrained to make p true, while $E_k$ remembers that p must be false. This process may repeat recursively: $E_i$ may further split into $E_{ii}$ and $E_{ik}$ and so on. Every execution of a branch statement may create a new set of children, and thus what would normally be a linear execution (if concrete values were used) now turns into a tree of executions (since symbolic values were used). A node s in the tree represents a program state (a binding of variables to values, along with constraints on those values), and an edge $s_i \rightarrow s_j$ indicates that $s_j$ is $s_i$'s successor on any path satisfying the constraints in $s_j$. Paths in the tree may be pursued simultaneously, as the tree unfurls; since program state is copied, the paths may be explored independently. Copy-on-write is used to make this process efficient.

$S^2E$ is based on the key observation that often only some families of paths are of interest. For example and according to one embodiment, the user may want to exhaustively explore all paths through a small program, but not care about all paths through the libraries it uses or the OS kernel. This means that, when entering that program, $S^2E$ may split executions to explore the various paths, but whenever it calls into some other part of the system, such as a library, exploration may cease and execution may revert to single-path. Then, when execution returns to the program, multi-path exploration may be resumed.

According to one or more embodiments, multi-path execution may correspond to expanding a family of paths by exploring the various side branches as they appear; switching to single-path mode is like corseting the family of paths. When multi-path exploration is on, the tree grows in width; when off, the tree no longer increases in width, only in depth. It is for this reason $S^2E$'s multi-path exploration is thought of as being elastic. $S^2E$ turns multi-path off whenever possible, to trim the execution tree so as to only include paths that are of interest for the target analysis. $S^2E$'s elasticity of multi-path exploration is key in being able to perform in vivo multi-path exploration of programs inside complex systems, like Windows™. By combining elasticity with virtualization, $S^2E$ offers the illusion of symbolically executing a full software stack, while actually only executing certain components. In particular, by concretely executing libraries and the OS kernel, $S^2E$ may allow a program's paths to be explored efficiently without having to model its surrounding environment, according to one embodiment.

Interleaving of symbolic execution phases with concrete phases must be done carefully, to preserve the meaningfulness of the explored execution. For example, a user may wish to analyze a program P in multi-path (symbolic) mode, but none of its libraries $L_i$ are to be explored symbolically. If P has a symbolic variable n and calls strncpy(dst, src, n) in $L_k$, $S^2E$ must convert n to some concrete value and invoke strncpy with that value. This is straightforward: solve the current path constraints with a SAT solver and get some legal value for n (say n=5) and call strncpy. But what happens to n after strncpy returns? Variable dst will contain n=5 bytes, whereas n prior to the call was symbolic—can n still be treated symbolically?

In S²E and according to one embodiment, when a symbolic value is converted to concrete (n: λ→5), the family of executions may be corseted. When a concrete value is converted to symbolic (n: 5→λ), the execution family may be allowed to expand. The process of doing this back and forth may be governed by the rules of an execution consistency model. For the above example, the user may require that n be constrained to value 5 in all executions following the return from strncpy. However, doing so may exclude a large number of paths from the analysis. S²E thus may allow a systematic and safe relaxation of the consistency model.

The mechanics of switching back and forth between multi-path (symbolic) and single-path (concrete) execution so that execution remains consistent is described according to one or more embodiments. To date, no symbolic execution engine may have the machinery for efficiently and flexibly crossing the symbolic/concrete boundary back and forth.

FIG. 1 provides a simple example to show how S²E might be used: an application app may use a library lib on top of an OS kernel, according to one embodiment. The target analysis may require to symbolically execute lib, but not app or kernel. Function appFn in the application may call a library function libFn, which eventually may invoke a system call sysFn. Once sysFn returns, libFn does some further processing and returns to appFn. When execution crosses into the symbolic domain from the concrete domain, the execution tree may expand. When execution returns to the concrete domain, the execution tree may be corseted and may not add any new paths, until execution returns to the symbolic domain. Some paths may terminate earlier than others, e.g., due to a crash or a successful return, according to some embodiments.

A concrete to symbolic transition may be implemented according to one or more embodiments. The two directions in which execution may cross the concrete/symbolic boundary is disclosed, according to one or more embodiments. When appFn calls libFn, it may do so by using concrete arguments; the simplest conversion may be to use an S²E selector to change the concrete arguments into symbolic ones, e.g., instead of libFn(10) call libFn(λ). Once this transition occurs, S²E may execute libFn symbolically using the argument, and simultaneously may execute libFn with the concrete argument as well. Once the concrete execution of libFn completes, S²E returns to appFn the concrete return value it expects. In this way, the execution of app is consistent, while at the same time allowing S²E to explore the paths in lib rooted at libFn and expose them to the S²E analyzer plugins. The concrete domain may remain unaware of libFn being executed symbolically.

Figure 2:
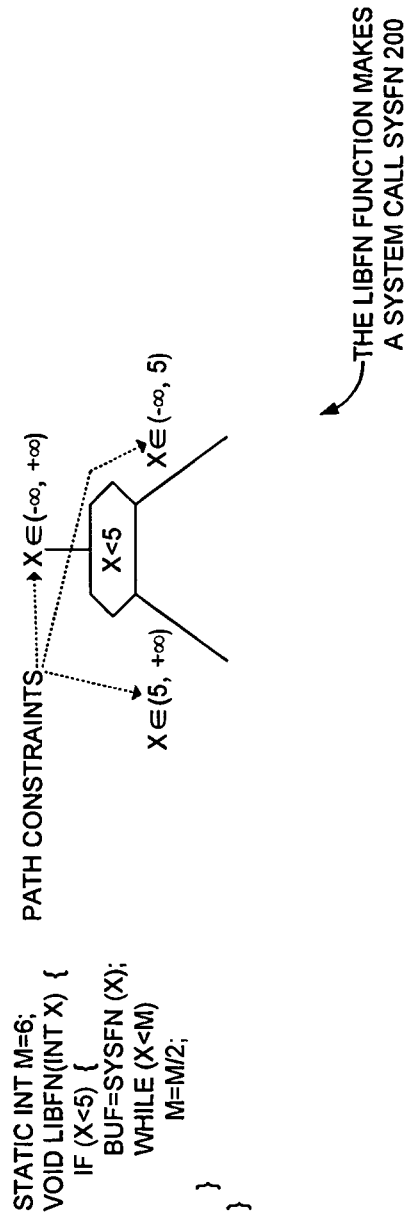
FIG. 2 illustrates how the libnFn function makes a system call sysFn.

A symbolic to concrete transition may be implemented according to one or more embodiments. Dealing with the libFn→sysFn call may be more complicated. For example, supposing libFn has the code shown in FIG. 2, and was called with an unconstrained symbolic value x∈(−∞, +∞). At the first if branch instruction, execution may fork into one path along which x∈[5, +∞) and another path where x∈(−∞, 5). These may be referred to as path constraints, as they constrain the values that x can take on that path. Along the then branch, a call to sysFn(x) may be made. This may require x to be concretized, since sysFn is in the concrete domain. Thus, S²E may choose a value, for example x=4, that may be consistent with the x∈(−∞, 5) constraint and may perform the sysFn(4) call, according to one or more exemplary embodiments.

S²E may actually employ lazy concretization: it may convert the value of x from symbolic to concrete on-demand, when the concretely running code actually reads x. This may be an important optimization when doing in-vivo symbolic execution, because a lot of data may be carried through the layers of the software stack without conversion. For example, when a program writes a buffer of symbolic data to the file system, there may be no branches in the kernel or the disk device driver that depend on this data, so the buffer may pass through un-concretized and may be written in symbolic form to the virtual disk, from where it may subsequently be read back in its symbolic form. For the sake of clarity, direct concretization may be assumed for the remainder of this application, and according to one or more exemplary embodiments.

Once sysFn completes, execution returns to libFn in the symbolic domain, and the path constraints may be updated to reflect that now x=4, according to one embodiment. This may not only be because x may have been concretized, but also because sysFn's return value may reflect (indirectly) this constraint by virtue of sysFn having executed with x=4. Furthermore, sysFn may have had side effects that depend in the same way on the constraint x=4. Execution of libFn may now continue, with correctness having been fully preserved. The problem, however, is that this constraint shrinks the family of future paths that can be explored from this point: x can no longer take all values in (−∞, 5) so, if subsequently there is a branch of the form if (x,0) . . . , the then branch may no longer be feasible due to this added constraint. This may be referred to as "overconstraining": it was not introduced by features of libFn's code, but rather as a result of concretizing x to call into the concrete domain. Here, x=4 is thought of as a soft constraint imposed by the symbolic/concrete boundary, while x ∈(−∞, 5) is a hard constraint imposed by libFn's code.

In S²E, branch conditions may be tracked in the concrete domain, in order to figure out how to redo the call in a way that would re-enable subsequent branches. The "overconstraining" problem may have two components: (a) the loss of paths that results directly from the concretization of x, and (b) the loss of paths that results indirectly via the constrained return value and side effects. Due to the way S²E implements the VM state that is shared between the concrete and symbolic domain, return values and side effects may be treated using identical mechanisms. Discussion of the constraints under different consistency models follows.

Execution consistency models may be provided according to one or more embodiments. The traditional assumption about the execution of a system is that the state at any point in time may be consistent, i.e., there exists a feasible execution path from the start state to the current state. However, there may be many analyses for which this assumption may be unnecessarily strong, and the cost of providing such consistency during multipath exploration may often be prohibitively high. For example, when unit testing is carried out, one typically exercises the unit in ways that are consistent with the unit's interface, without regard to whether all those paths are indeed feasible in the integrated system. This is both because testing the entire system in a way that exercises all paths through the unit is too expensive, and because exercising the unit as described above actually offers a stronger level of confidence in its correctness.

For S²E, which aims to be a general platform for such analyses, several levels of execution consistency may be provided, to enable users to make the right tradeoffs, according to one or more embodiments. Alternate execution consistency models are defined, after which the way in which these different models dictate the conversions applied upon transition between the symbolic and concrete domains is described, according to one or more embodiments. By relaxing the execution consistency, many analyses may be performed more efficiently, akin to how relaxed memory consistency models may allow architects to speed up CPU pipelines, or to how different isolation levels can speed up database applications. This may be the first systemic exploration of several consistency models in the context of software execution. The key distinction between execution consistency models is which execution paths may be admissible under that model. Choosing an appropriate consistency model may be a tradeoff between how "realistic" the admitted paths are vs. the cost of enforcing the required model. The appropriateness of this choice is driven by the nature of the analysis, since it is the analysis that may dictate how the different paths may affect completeness and soundness of the analysis.

According to at least some embodiments, the execution consistency models may be defined in terms of which paths may be included vs. excluded under a given model. An execution path may be statically feasible, in the sense that there may exist a path in the CFG corresponding to the execution in question. A subset of the statically feasible paths may be locally feasible in the symbolic domain, in the sense that the execution may be consistent with both the CFG and with the restrictions on control flow imposed by the data-related constraints within the symbolic domain. Finally, a subset of locally feasible paths may be globally feasible in the symbolic domain, in the sense that the execution may be also consistent with control flow restrictions imposed by data-related constraints in the concrete domain, according to one or more embodiments. Based solely on the code executing in the symbolic domain, with no knowledge of code in the concrete domain, it may be impossible to tell apart locally feasible from globally feasible paths.

Figure 3:
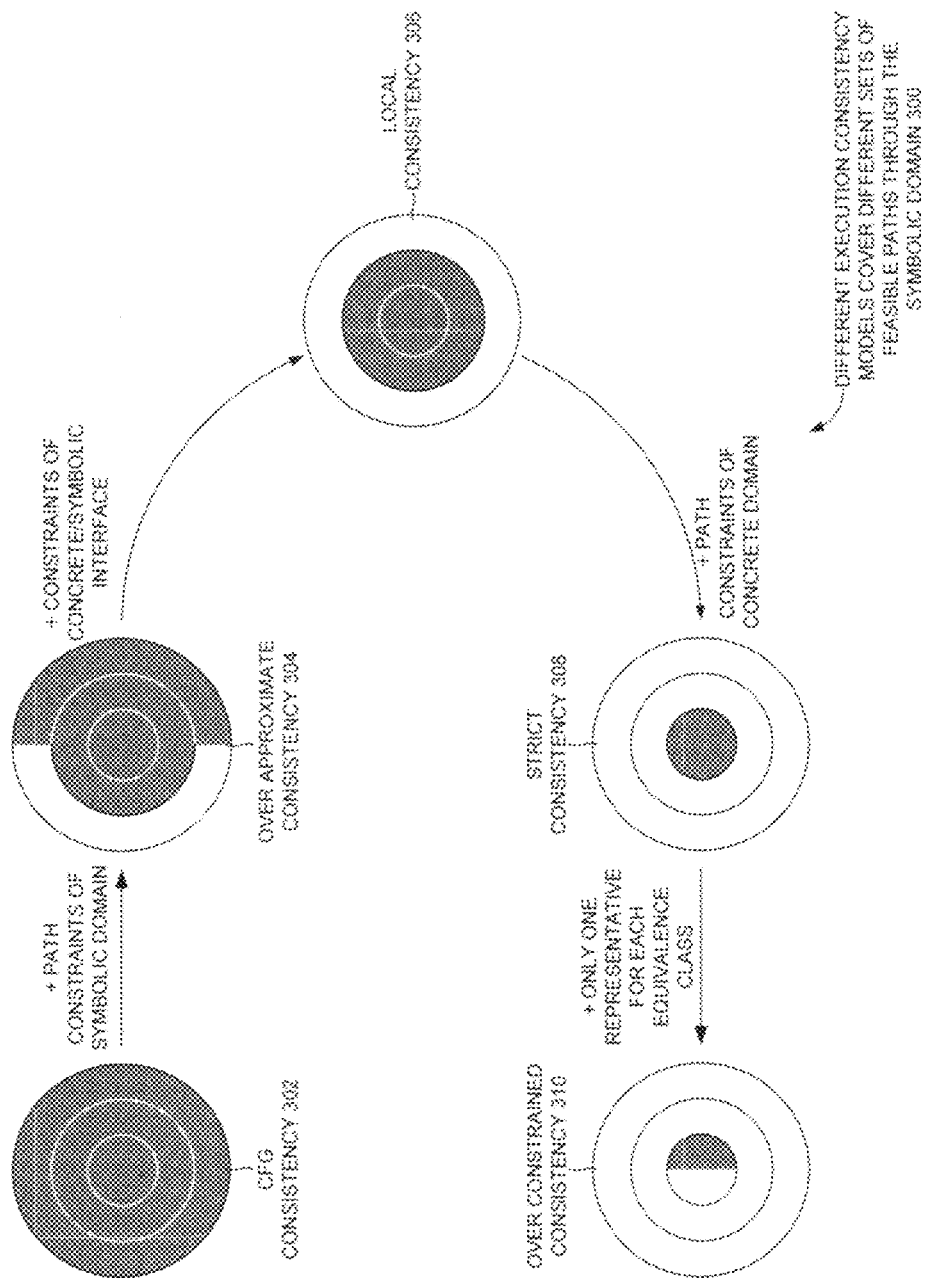
FIG. 3 illustrates the different execution consistency models that cover different sets of feasible paths through the symbolic domain, according to one or more embodiments.

According to one or more embodiments according to one or more embodiments a stronger form of execution consistency (304) may be one in which the application may exclude all paths that may be decided to be infeasible based on knowledge that may lie solely within the boundaries of the symbolic domain. In other words, some of the paths in the (inter-procedural) CFG of the symbolic domain may be determined to be infeasible due to the restrictions imposed by the code on the values of variables. For example, and according to one or more embodiments, if $y=x^2+2$ is followed later on by if ($y>1$), then under this consistency model the else branch may not be exercised, even though the CFG has the corresponding path. This is the model that may be used for reverse engineering proprietary device drivers. As illustrated in FIG. 3, this model may correspond to restricting the CFG consistency by applying all path constraints resulting from the symbolic domain. Such a consistency model may be useful, for instance, for analyses concerning a unit of code that may be able to tolerate violations of its interface contracts, according to one or more embodiments.

According to one or more embodiments, a further strengthening of consistency may be achieved by excluding paths that may be incompatible with the contracts imposed by the interface between the concrete and the symbolic domain. For example and according to one or more embodiments, when defining the symbolic domain as a device driver, under this consistency model (306) all paths corresponding to calls from the kernel to the driver that do not conform to the kernel/driver interface may be excluded (e.g., if the interface promises that an incoming value x≠0, then paths corresponding to x=0 may not be included under this model. This may correspond to excluding all paths that are not locally feasible, by restricting the over-approximate consistency with all interface-related constraints. This consistency model may be used in the device driver testing use case, according to one or more embodiments.

By excluding all paths that are not globally feasible, i.e., those that are inconsistent with the operation of the concrete domain, strict consistency (308) is arrived at, according to one or more embodiments. The paths under this model may correspond exactly to the set of paths obtained by executing the entire system "normally" with all possible inputs from the outside (network packets, user input, timer interrupts); in other words, it may include all possible ways in which a single-path dynamic analysis could be done. In other words, if it was feasible to symbolically execute the entire system in an engine like KLEE, then the resulting model may be strict consistency, according to one or more embodiments. The globally infeasible paths may be eliminated by further restricting local consistency with the path constraints from the concrete domain (see FIG. 3)—this may ensure that all paths may be consistent with all path constraints of the entire system, both the concretely running and the symbolically running portion, according to one or more embodiments.

The conjunction of constraints along each path may define a set of equivalence classes on the system. In the over-constrained consistency model (310), there may exist only one path in the concrete domain for every choice of representatives of the equivalence classes in the symbolic domain. The reason this model may be more restricted than strict consistency because calls from the symbolic domain into the concrete domain may exercise only one concrete path for each combination of representative values from the equivalence classes, and so, the returned result of such paths may end up restricting the paths that can be exercised in the symbolic domain, according to one or more embodiments. The reason this model may be useful is mainly from a practical point of view: providing this type of consistency may be cheap in any system that combines symbolic with concrete execution.

Implementing the CFG consistency model (302) may be trivial, as it may afford the explorer maximum flexibility and may not need to compute data-related feasibility of paths, according to one or more embodiments. Also, solving path constraints may be by far the dominant computational overhead involved in symbolic execution, so being able to reduce the use of the solver may be beneficial. This type of exploration may be useful, for instance, for analyses that may only wish to exercise basic blocks, as might be the case for a dynamic disassembler. Static disassembly of self-encrypted, packed, or otherwise obfuscated code may be notoriously difficult, but executing such a program in $S^2E$ under the CFG consistency model may be sufficient to disassemble it—the program may de-obfuscates itself in order to run on the (virtual) CPU, and a simple analyzer may record the resulting instructions for each basic block, according to one or more embodiments. Combined with a steering plugin that maximized block coverage, this consistency model may offer a rapid way of disassembling obfuscated programs.

All the effects of the concrete domain may be converted into unconstrained symbolic data when implementing over-approximate consistency, according to one or more embodiments. When returning from the sysFn function, path constraints may remain unchanged, the return value may be marked symbolic, and so may any side effects caused by sysFn. The result is that the concrete domain may be executed entirely concretely, while $S^2E$ ends up exploring all paths in the symbolic domain, according to one or more embodiments. The advantage of this model may be that crossing the symbolic/concrete boundary may incur zero cost, and execution may be complete: no feasible paths may be ever excluded from the symbex of libFn. Over approximate consistency model may commonly occur in model checkers that may use predicate abstraction, such as SLAM/SDV, according to one or more embodiments.

Local Consistency may be implemented to preserve both soundness and completeness from the point of view of the target code, but not necessarily from the point of view of an outside observer of the system, according to one or more embodiments. Consider a system S (e.g., a full Windows system) and part P of it is to be analyzed (e.g., a module in a program). Data from P may be replaced with symbolic values. However, suppose may be some invariant between S\P and P. Overwriting data in P with symbolic values may break this invariant, making the system globally inconsistent. However, as long as neither code from S\P nor from P depends on that invariant, the execution may be locally consistent: although the system as a whole may be inconsistent, this fact may have no effect on the execution. This consistency model may be useful for testing, because it maximizes coverage while avoiding false positives; all explored paths may be guaranteed feasible in the tested module. For example, a program P may print to the console a concrete buffer, and $S^2E$ may replace it with symbolic values. The system may be locally consistent as long as the program does not later check that the output that actually made it to the console matches the buffer it initially submitted. In this case, none of P's subsequent behavior is influenced by the expansion of the symbolic tree. Since $S^2E$ directly maintains the virtual machine state, it may be straightforward to track the reads and writes of module P, and catch cases where any concrete data that was turned into symbolic is read again by the writer. In this case, $S^2E$ may flag the execution as violating local consistency, so the corresponding analyzer plugin may decide whether to take it into consideration or not, according to one or more embodiments.

Strict Consistency may also be implemented, according to one or more embodiments. When a symbolic to concrete call returns to the symbolic domain, preserving full consistency of the execution may require ensuring that all symbolic variables are constrained exactly the way they may be constrained if the entire system was symbolically executed. These variables may be no less constrained and no more constrained than that. Under strict consistency, only data coming from outside the system (e.g., network packets) may be made symbolic, while all internal data may be correctly constrained as if symbolically executing the whole system. In other words, only data that is outside the control of the system being analyzed may legitimately take on any values, since there may be no way in practice to constrain it, according to one or more embodiments.

$S^2E$ may enforce strict consistency via incremental symbolic execution of the concrete domain, i.e., it may symbolically execute parts of the concrete domain, as much as necessary to preserve consistency, according to one or more embodiments. The execution of sysFn may proceed as if it was executed symbolically, but only one feasible path may be pursued in a depth-first manner, according to one or more embodiments. All the other forked execution tree nodes may be stored in a waitlist, but not explored. This, in essence, simulates a concrete, single-path execution through a symbolically executing concrete domain. After returning to libFn, the current path may carry the constraints that were accumulated in the concrete domain, and symbolic execution continues in libFn as if sysFn had executed symbolically. The value of x is constrained according to the (depth-first) path pursued in sysFn, and so are the return value and the side effects. The waitlist with the unexplored nodes is preserved.

If, while executing libFn, a branch that depends on x, sysFn's return value, or sysFn's side effects (all of which are recorded as symbolic), becomes infeasible due to the constraints imposed by the call to sysFn, $S^2E$ returns to the waitlist, according to one or more embodiments. It may look for an unexplored node such that the branch is enabled in libFn, and execution resumes at that node, essentially adding another family of paths to the overall execution tree. If no such node is found in the waitlist, then it is correct to not follow that branch, because the branch is rendered infeasible not by a soft constraint (due to concretization), but by a hard constraint (due to properties of lib code). Executing in this way may be consistent because, from the point of view of lib, the execution may be equivalent to that of doing full symbolic execution on the entire system. Of course, many more paths may be explored under full symbolic execution, but none of those other paths would alter the paths in lib. The concrete domain may be executed symbolically in an incremental manner, depending on lib's implicit needs, according to one or more embodiments.

Over constrained consistency may also be implemented, according to one or more embodiments. This model may be computationally cheap, because conversions are only done in the symbolic → concrete direction, but not on the return path. This may mean that x is concretized to be x=4 and, from there on, this soft constraint may be treated as a hard constraint on x. This form of consistency may guarantee globally feasible paths, but many feasible paths may end up trimmed away, because treating x=4 as a hard constraint may curtail many feasible paths during the exploration of libFn, according to one or more embodiments.

$S^2E$ may provide a more moderately over-constrained consistency model, which may preserve global feasibility, but may be more inclusive of paths over the more aggressive basic model of over-constraining, according to one or more embodiments. Of course, this may come at the cost of added computation. Here, $S^2E$ may use an algorithm similar to the one for strict consistency, but with a substantial performance improvement afforded by the relaxation of completeness. Instead of incrementally executing sysFn symbolically, $S^2E$ may execute it purely concretely, but may also collect the path constraints along the concrete path, according to one or more embodiments. These constraints may indicate what must hold of x, sysFn's return value, and sysFn's side effects for that one path through sysFn to be feasible. These path constraints may then carried over into the symbolic domain. This model may be similar to the aggressive-over-constrained one, with the difference that the constraints applied in the symbolic domain are less strict. For example, instead of x=4, the constraint may end up being x>0^x<5. Nevertheless, the resulting constraints may be treated as hard constraints, so there may be some paths through lib that may be rendered infeasible by this concretization, according to one or more embodiments. The cost of doing this may be merely that of tracking the constraints in the concrete domain.

Two final details may be worth noting. First, that, lazy concretization may be completely orthogonal to which consistency model is used—it may be a correctness-preserving optimization, and second that $S^2E$ users may also define their own custom consistency models—$S^2E$ plugins have no restriction on how and where to insert symbolic data. This may be leveraged in the implementation of the reverse engineering tool, where the CFG consistency model was slightly constrained, in order to preserve consistency at the level of path segments, according to one or more embodiments.

There may be tradeoffs in choose execution consistency models, according to one or more embodiments. When choosing a consistency model, $S^2E$ users must first decide what is the strongest guarantee required for the analysis under consideration in regard to the consistency of execution paths. Then they may select the weakest consistency model that satisfies this guarantee. The various consistency models may offer different tradeoffs in terms of path feasibility vs. analysis runtime. Some models may be substantially more expensive to enforce than others. Required running time depends both on the model and on the analysis being performed, thus it may be difficult to estimate ahead of time. Several empirical data points are provided for running time. So far orders-of-magnitude gains in running time when taking one relaxation step in terms of consistency have been observed. Beyond just running time, the different models may also offer different tradeoffs between soundness and completeness with respect to the analysis, according to one or more embodiments. Over-approximate execution may expand the execution tree with paths that may not actually occur in a real execution, and may thus lead to false positives in the analysis (i.e., expose the analysis to paths that are globally infeasible). Over-constrained execution, on the other hand, may miss exploring real paths (i.e., does not expose the analysis to all globally feasible paths):

Completeness may typically defined as TN/(TN+FN), where TN and FN are the number of true and false negatives respectively, and soundness as TP/(TP+FP), according to one or more embodiments. Intuitively, full completeness may be achieved when there are zero false negatives, and an analysis is perfectly sound when there are no false positives.

Figure 4:
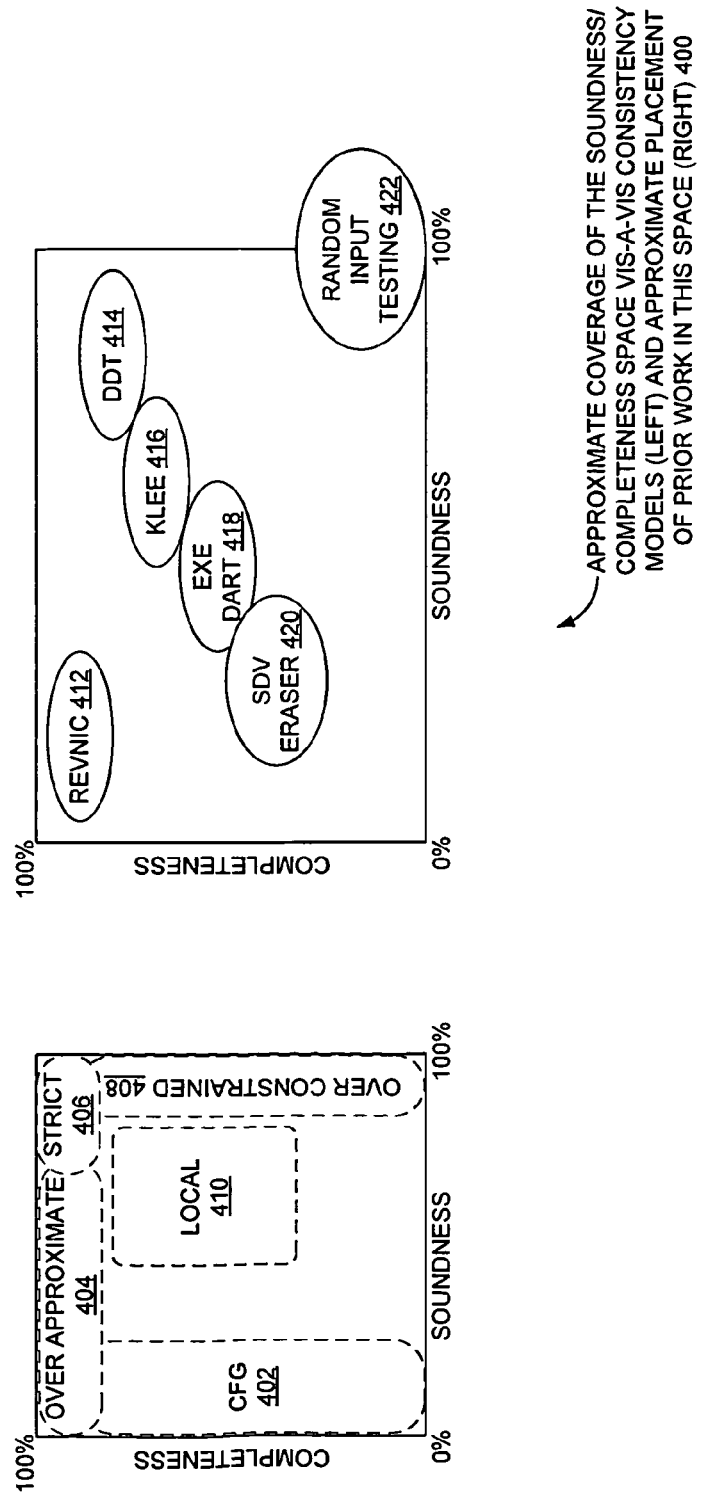
FIG. 4 illustrates a qualitative sense of the approximate coverage of soundness and completeness as compared with consistency models and prior work in this space, that characterize the different execution models, according to one or more embodiments.

FIG. 4 gives a qualitative sense of the levels of soundness and completeness that may characterize each model. Furthermore, recently-published tools in this space are shown on the right, to illustrate these models. According to one or more embodiments, the following testing scenarios may be true. Random input testing (422) may be sound, because it may run with concrete values, and no symbolic values; this may come at the cost of low coverage. DART (218) may have higher completeness, because it computes concrete input values in a smarter way, by looking at the path constraints gathered during concrete runs. KLEE (416) and EXE (418) may be unsound in the presence of external function calls (e.g., system calls), because external function calls made in one path may affect all the other paths through their side effects. DDT (414) may have both local and strict consistency, depending on annotations. SLAM, although providing higher coverage, may less sound than other tools because it relies on static analysis and program abstraction to look for bugs, and it may require modeling the behavior of the system in which the device driver is running.

Some models may also be subsumed by other models, or viewed as a combination of other models, according to one or more embodiments. For example, both local consistency (410) and CFG consistency (402) may be thought of as special cases of over-approximate consistency (404). Local consistency may be popular due to the advantageous performance/semantics tradeoff, with overconstrained consistency being next in line, due to its performance advantages.

A key approach to scaling symbolic execution in recent literature may be improving the search strategy, i.e., the order in which unexplored paths are analyzed, according to one or more embodiments. For example, KLEE devised an efficient coverage-optimized search strategy that tries to cover as many new basic blocks as quickly as possible. This is partly motivated by the fact that symbolic execution has been used exclusively for bug finding so far. The choice of consistency model may be orthogonal to the search, strategy, and may offer another lever for improving the scalability of a wide variety of analyses. $S^2E$ may provide out-of-the-box several possible search strategies and custom strategies may be written as well, according to one or more embodiments.

Figure 6:
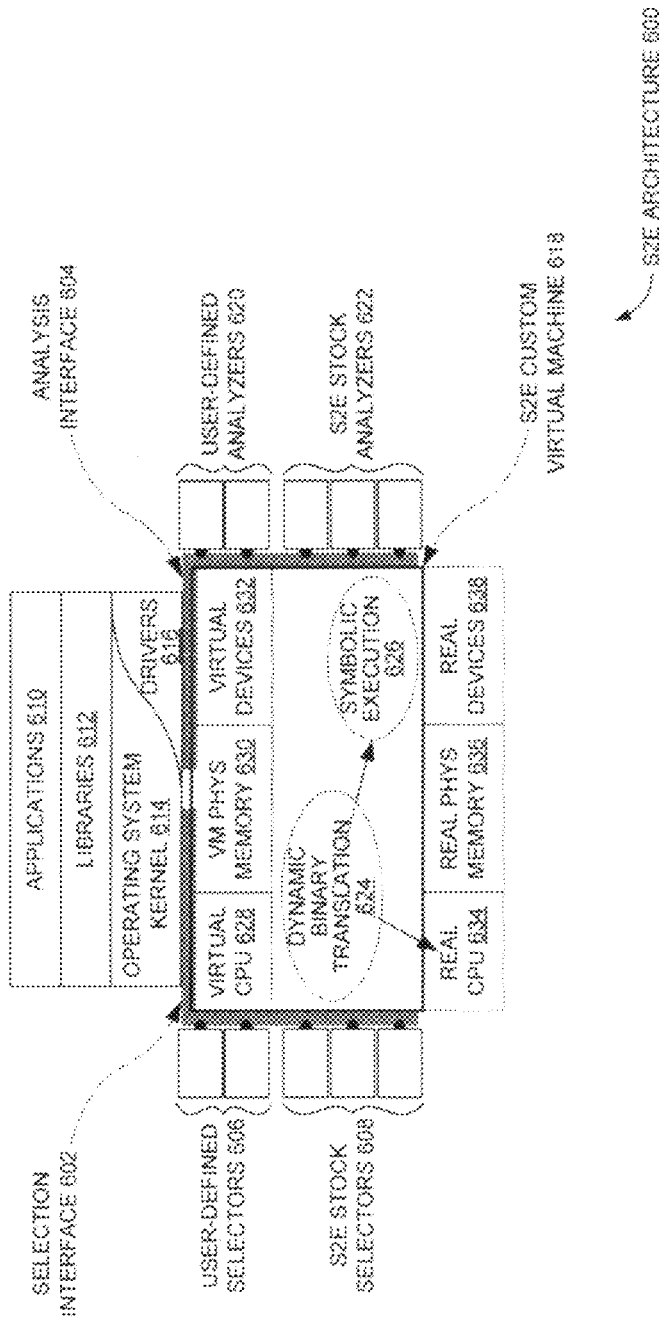
FIG. 6 is an illustration of the architecture of the $S^2E$ platform, according to one more embodiments.

System analysis may be performed, according to one or more embodiments. As illustrated in FIG. 6, the $S^2E$ platform may consist of a customized virtual machine, dynamic binary translator also known as DBT (624), an embedded symbolic execution engine (626), and modular plugin architecture, according to one or more embodiments. The DBT may decide which guest machine instructions to execute natively on the physical CPU (634) vs. which ones to execute symbolically using the embedded symbolic execution engine. There may exist two key interfaces: the selection interface (602), used to guide the exploration of execution paths, and the analysis interface (604), used to collect events or check properties of execution paths. Both interfaces may accept modular selection and analysis plugins. $S^2E$ may provide a rich set of plugins that users may assemble into custom analysis tools, according to one or more embodiments. One may also extend $S^2E$ with new plugins, using $S^2E$'s developer API, according to one or more embodiments.

The first step in using $S^2E$ may be deciding on a policy for which part of a program to execute in multi-path (symbolic) mode vs. single-path (concrete); this policy may be encoded in a selector. $S^2E$ may provide a default set of selectors for the most common types of selection; these may be composed to achieve more complex selection, according to one or more embodiments. They may fall into three categories: Data-based selection may provide a way to expand an execution path into a multi-path execution by introducing symbolic values into the system. Any time $S^2E$ encounters a branch predicate involving a symbolic value, it may fork the execution. Symbolic data may enter the program from various sources, and $S^2E$ provides a corresponding selector: CommandLine for symbolic command line arguments, Environment for environment variables, WindowsRegistry for registry entries, etc. Symbolic values may be specified in KQuery, a language for representing constraint expressions and queries in the form of quantifier-free formulas over bitvectors and arrays, according to one or more embodiments.

Often it is useful to introduce a symbolic value at an internal interface, according to one or more embodiments. For example, a server program may call a library function $f(x)$ almost always with $x=10$, but may call it with $x<10$ in strange corner cases that may be hard to induce via external workloads. The developer may therefore be interested in exploring the behavior off for all values $0 \leq x \leq 10$. For such analyses, SymbolicInjector selector may be provided, which may overwrite arguments or return values with symbolic values. It may take a list of function names or addresses, along with KQuery expressions describing the desired symbolic values. SymbolicInjector may be extended to inject symbolic values whose constraints are decided at runtime, according to one or more embodiments.

According to one or more embodiments, code-based selection may enable/disable multi-path execution depending on whether the program counter is within a target code area or not; e.g., one may focus cache profiling on a Web browser's SSL code, to see if it is vulnerable to side channel attacks. The CodeRange plugin takes the name of the target program, library, driver, etc. and a list of program counter ranges within which multipath execution is to be enabled. Each such range may be an inclusion or an exclusion range, indicating that code within that range should be explored in multi-path (respectively single-path) mode. CodeRange may be typically used in conjunction with data-based selectors, to constrain the multi-path execution they induce to only the code areas of interest, according to one or more embodiments.

Priority-based selection is used to define the order in which paths are explored within the family of paths defined with data-based and code-based selectors, according to one or more embodiments. $S^2E$ includes some obvious choices, such as Random, DepthFirst, and BreadthFirst. The MaxCoverage selector works with the coverage analyzers described below to heuristically select paths that maximize coverage. The PathKiller selector monitors the executed program and deletes paths that are determined to no longer be of interest to the analysis. For example, paths can be killed if a fixed sequence of program counters repeats more than 'n' times; this avoids getting stuck in polling loops, according to one or more embodiments.

Once the selectors define a family of paths, $S^2E$ executes these paths and exposes them to the analyzer plugins, according to one or more embodiments. One class of analyzers are bug finders, such as DataRaceDetector and DeadlockDetector, which look for the corresponding bug conditions and output an executable execution trace every time they encounter a bug, according to one or more embodiments.

Another class of analyzers may be used for coverage measurement, as in the BasicBlockCoverage, BranchCoverage, and PathCoverage plugins, according to one or more embodiments. Another type of analyzer is Execution-Tracer, which records the instructions executed along a path, along with the memory accesses, register values, and hardware I/O. Finally, the PerformanceProfile analyzer counts cache misses, TLB misses, and page faults incurred along each path—this can be used to obtain a performance envelope of an application. While most plugins are OS-agnostic, $S^2E$ may provide a set of analyzers that expose Windows-specific events using various hacks. For example, the WinDriverLoad analyzer parses OS-private data structures and notifies other plugins when the OS loads a driver. The WinBugCheck plugin catches Windows-specific errors, like "blue screen of death" events and kernel hangs.

The interface that can be used to write new plugins or to extend the default plugins is described. Both selectors and analyzers use the same interface; the only distinction between selectors and analyzers is that selectors influence the execution of the program, whereas analyzers are passive observers. $S^2E$ has a modular plugin architecture, in which plugins communicate in a publish/subscribe fashion, according to one or more embodiments. The $S^2E$ platform produces events, for which plugins can register to receive, and plugins themselves can generate events that are then distributed to their subscribers. To register for a class of events, a plugin invokes a call of the type onEventX(callbackPtr). The callback is invoked every time event X occurs, and is passed a pointer to an ExecState object.

The ExecState object captures the current state of the entire virtual machine along a specific path. For each path being explored, there exists a distinct ExecState object instance (300); when execution forks, each child execution receives its own private copy of the parent ExecState. Also, aggressive use of copy-on-write reduces the memory overhead substantially. Via ExecState, a plugin has access to the entire VM state, including the processor, VM physical memory (630), and virtual devices (632), according to one or more embodiments. The plugin can also toggle multi-path execution and read/write VM memory and registers as seen in Table 1 of FIG. 5. A plugin can obtain the PID of the running process from the page directory base register, can read/write page tables and VM physical memory, and may change the control flow by modifying the program counter, according to one or more embodiments.

Plugins partition their own state into per-path state (e.g., number of cache misses along a path) and global state (e.g., total number of basic blocks touched). The per-path state is stored in a PluginState object, which hangs off of the ExecState object (500). PluginState must implement a clone method, so that it can be cloned together with ExecState whenever $S^2E$ forks execution, according to one or more embodiments. Global plugin state can live on the plugin's own heap and stack. $S^2E$ events are generated either by the $S^2E$ platform or other plugins, according to one or more embodiments. Core events (550) are exported by $S^2E$ and arise from regular code translation and execution (e.g., as illustrated in Table 2 of FIG. 5).

The dynamic binary translator (DBT) turns blocks of guest code into corresponding host code; for each block of code this is typically done only once, according to one or more embodiments. During the translation process, a plugin may be interested in marking certain instructions (e.g., function calls) for subsequent notification. It registers for onInstrTranslation and, when notified, it inspects the ExecState to see which instruction is about to be translated; if it is of interest (e.g., it is a call instruction), the plugin marks it as such. Whenever a marked instruction is executed by the VM, the onInstrExecution event is raised, and the interested plugin is notified. For example, the CodeRange plugin receives onInstrTranslation events and marks the instruction depending on whether it is or not an entry/exit point for a code range of interest. Having the onInstrTranslation and onInstrExecution events separate leverages the fact that each instruction gets translated once, but may get executed millions of times, as in the body of a loop. For most analyses, onInstrExecution ends up being raised so rarely, that it introduces no runtime overhead, according to one or more embodiments.

When $S^2E$ is about to split the execution due to a branch depending on symbolic data, it raises the onExecutionFork event, according to one or more embodiments. Most plugins need not keep track of forks, because the PluginState is automatically cloned. The on Exception event is raised when a hardware interrupt occurs. Four specialized events, on RegularMemRead/Write and onIOMemRead/Write are raised when memory is read or written. To register for these events, a plugin provides an address range of interest. Technically, this functionality could be implemented by using onInstrTranslation and onInstrExecution, but providing these specialized events is substantially more efficient, because they can be raised directly from the code handling the VM physical memory, according to one or more embodiments.

$S^2E$ opcodes are custom guest machine instructions that are directly interpreted by $S^2E$, and they provide a communication channel that circumvents all plugins. $S^2E$ has custom opcodes for creating symbolic values (S2SYM), enabling/disabling multi-path execution (S2ENA and S2DIS) and logging debug information (S2OUT). These give developers even finer grain control over multipath execution and analysis; they can be injected into the target programs using tools like PIN. Our own s2e.exe launcher uses these custom opcodes. Selectors can enable/disable multipath execution based on arbitrary criteria and can manipulate machine state, according to one or more embodiments. Analyzers can collect information about low-level hardware events all the way up to program-level events; they can probe memory to extract any information they need.

The $S^2E$ system reuses parts of the QEMU virtual machine, the KLEE symbolic execution engine, and the LLVM tool chain, according to one or more embodiments. To these, inventors added 23 KLOC (1 KLOC=1000 lines of code) of C++ code written from scratch, not including 3rd party libraries. Inventors added 1 KLOC of new code to KLEE and modified 1.5 KLOC; in QEMU, we added 1.5 KLOC of new code and modified 3.5 KLOC of existing code. For all LOC measurements reported herein the SlocCount tool was used.

Developing the S²E engine took on the order of 11 person-months; there is no code shared between S²E and RevNIC or DDT. S²E currently runs on MacOS X, Windows, and Linux; it can execute any guest OS that runs on x86, and can be easily extended to other architectures, like ARM or PowerPC, according to one or more embodiments.

S²E may explore paths by running the target system in a virtual machine and selectively executing small parts of it symbolically, according to one or more embodiments. Depending on which paths are desired, some of the system's machine instructions are dynamically translated within the VM into an intermediate representation suitable for symbolic execution, while the rest are run natively. Underneath the covers, S²E carefully converts data between the symbolic and concrete domains, so as to offer the illusion that the full system (OS, libraries, etc.) is executed on multiple paths. S²E can mix concrete with symbolic execution in the same path by using a representation of machine state that is shared between the VM and the embedded symbolic execution engine. In this way, S²E may have distinct copies of the entire machine state for distinct paths, with suitable copy-on-write optimizations, and S²E can transparently convert data between concrete and symbolic, according to one or more embodiments.

Surprisingly, running user-mode code in S²E turned out to be harder than kernel-mode code. Each system state has its own virtual time, which freezes when that state is not being run (i.e., is not in an actively explored path). Running code symbolically is slower than native, so the timer interrupts have to be disabled, otherwise handling the interrupts leaves no time for useful work. The interrupts are re-enabled once the symbolic code is finished and the timer interrupts are not disabled, instead the time is slowed down when running in symbolic mode. This is not an issue in systems like RevNIC or DDT, because they only run kernel-mode code. In order to achieve transparent interleaving of symbolic and concrete execution, QEMU's DBT was modified to translate the instructions that depend on symbolic data to LLVM and dispatch them to Klee. Most instructions, however, run natively, which improves performance. A new x86 was written to LLVM back-end for QEMU, which is much more efficient than the one used in RevNIC. Neither the guest OS nor Klee are aware of the x86 to LLVM translation. S²E redirects all guest physical memory accesses (including MMIO devices) to the Klee memory state object.

Besides physical memory, S²E may also synchronize the internal state of the virtual devices, according to one or more embodiments. QEMU's snapshot mechanisms may be used to automatically save and restore virtual devices and CPU states when switching execution states. The shared representation of memory and device state between the concrete and symbolic domains may enable S²E to do on-demand concretization of data that is stored as symbolic, according to one or more embodiments. A snapshot can range from hundreds of MBs to GBs. An aggressive copy-on-write is used to transparently share common state between snapshots of physical memory and disks. Some states need not be saved; for example no snapshot is made of video memory, so all paths share the same frame buffer. This makes for intriguing visual effects on screen, with multiple erratic mouse cursors and BSODs blending chaotically.

Interleaved concrete/symbolic execution and copy-on-write are transparent to the guest OS. Thus, guest OSes run out-of-the-box. State synchronization allows the guest to have a view of the system that is congruent with the chosen execution consistency model. This also makes it easy to replay execution paths of interest. To enable plugins to register and listen for events, signals provided by the libsigc++ library are used. S²E also provides a SQL interface for the plugins to store information for offline processing, according to one or more embodiments. For example, the BranchCoverage analyzer saves to the database the source and destination address of every taken branch. Even though S²E performs the symbolic execution on LLVM byte code, just like KLEE, a much lower-level representation of the program is obtained than what would be obtained by compiling source code to LLVM (as done in KLEE). In fact, what S²E sees is not the original program, but code that simulates the execution of the original program on the target CPU architecture. For example, conditional x86 branches turned into LLVM depend on the simulated EFLAGS register, and this leads to overly bloated branch conditions when expressed symbolically, according to one or more embodiments.

Therefore, a bitfield theory expression simplifier is implemented so as to tailor to the constraints resulting from our DBT-based implementation. First, it starts from the bottom of the expression (represented as a tree) and propagates information about individual bits whose value is known. If an expression has all bits known, it is replaced with the constant result. Second, it propagates top-down information about bits that are ignored by the upper part of the expression; when an operator modifies only bits that are ignored later, that entire operation is removed. This is an example of applying domain-specific logic to improve the solver speed; it is expected that the simplifier will be directly useful for KLEE as well, when testing programs that heavily use bitfields, according to one or more embodiments.

S²E may be used to build three different tools: one for automatically testing proprietary drivers, one for reverse engineering binary device drivers, and one for doing multi-path in vivo performance profiling, according to one or more embodiments. One of S²E's main goals is to enable rapid prototyping of useful analysis tools. In FIG. 7, the substantial productivity advantage of using S²E compared to writing these tools from scratch is illustrated. For the tools built, S²E engendered two orders of magnitude improvement in both development time (704) and resulting code volume (706). This justifies the efforts to create general abstractions for multi-path in-vivo analyses, and to centralize them into one platform, according to one or more embodiments.

As a first validation step, S²E may be used to build $DDT_S$, a tool for testing closed-source Windows device drivers. The original DDT was an ad-hoc combination of changes to QEMU and KLEE along with hand-written interface annotations: 35 KLOC added to QEMU, 3 KLOC added to KLEE, 2 KLOC modified in KLEE, and 7 KLOC modified in QEMU. By contrast, $DDT_S$ is 720 LOC of C++ code, which glues together several exploration and analysis plugins, and provides the necessary kernel/driver interface annotations. In $DDT_S$, the symbolic domain is defined via the CodeRange plugin, to restrict it to the target driver's code segment. Since this is a bug-finding tool, false positives are to be reduced, so $DDT_S$ uses local execution consistency, as defined by the interface annotations mentioned. If these annotations are removed, then $DDT_S$ reverts to strict consistency. To search for bugs along the explored paths, $DDT_S$ may be configured to use three analyzers: DataRaceDetector, DeadlockDetector, and WinBugCheck. To collect additional information about the quality of testing, the BasicBlockCoverage analyzer plugin may be used, according to one or more embodiments.

$DDT_S$ and DDT may run on six proprietary Windows drivers that are Microsoft-certified and have been shipping with Windows for years: RTL8029, AMD PCNet, Ensoniq AudioPCI, Intel Pro/1000, Intel Pro/100, and Intel AC97, according to one or more embodiments. $DDT_S$ found the same 14 bugs reported, including memory leaks, memory corruption, segmentation faults, and race conditions. Of these 14 bugs, 6 can be found when operating under strict consistency, and relaxation to local consistency (via annotations) helps find 8 additional bugs. The tool takes 3-6 minutes to complete testing of one driver and explores tens of thousands of paths in each one. Experiments were run on a 2x quad-core Xeon 2 GHz CPU with 20 GB RAM, Debian Linux 2.6.26 host, and Windows XP SP3 guest. Each bug was validated; for the deterministic bugs, the concrete inputs provided by $DDT_S$ to verify reproducibility were used. The concurrency bugs are harder to reproduce this way, so the disassembly was manually inspected and their validity confirmed. None of the reported warnings are false positives, indicating the appropriateness of local consistency for bug finding. $S^2E$ allowed the user to write a powerful device driver tester that is functionally equivalent to DDT, but took 63 times less development time and requires 65 times less code.

RevNIC, a tool for reverse engineering binary device drivers, may also be re-implemented (the re-implementation is referred to herein as $Rev_S$), according to one or more embodiments. The tool takes a closed-source binary driver, traces its execution, and then feeds the traces to an offline component that reverse engineers the driver's logic and produces new device driver code that implements the exact same hardware protocol as the original driver. RevNIC can produce replacement drivers with fewer bugs and fewer security vulnerabilities than the originals and, since the synthesized code can be targeted at any OS, it also makes porting of drivers easier. No vendor documentation or source code is required in the process. Adopting the $S^2E$ perspective, reverse engineering was cast as a type of behavior analysis. The symbolic domain was defined via code selection to be restricted to the driver's code segment. $REV_S$ uses the ExecutionTracer analyzer plugin, which logs the driver's executed instructions, memory and register accesses, hardware I/O, and writes them to a file. The collected traces can then be processed by RevNIC's offline analysis tool; this component therefore does not need to be rewritten. $REV_S$ also needs the WinDriverLoad analyzer, to signal to the tracing plugin when the driver has loaded.

The main goal of the tracer is to merely see each basic block execute, in order to extract its logic; full path consistency is not necessary, according to one or more embodiments. The high-level reason is that the trace interpreter only needs fragments of paths in order to reconstruct the original control flow graph. Therefore, $REV_S$ is a good candidate for over approximate consistency, which is an extreme example of sacrificing consistency for the sake of getting code coverage fast. $REV_S$ reuses RevNIC's trace analysis and code synthesis module, while completely re-implementing the tracing. As a result, $REV_S$ has 720 LOC of C++ plus 10 KLOC of offline tools shared with RevNIC. To compare $REV_S$ to RevNIC, it was run on the same four proprietary Windows drivers reported: AMD PCNet, Realtek RTL8139, SMSC 91C111, and Realtek RTL8029, which were then ported to four different OSes: Windows, Linux, KitOS, and μC/OS-II. $REV_S$'s results are the same as RevNIC's.

To precisely determine equivalence, all the basic blocks covered by $REV_S$ were inspected, and found them to be the same as the ones for RevNIC; given the deterministic process of converting these into synthetic drivers, this confirms the resulting drivers are functionally the same. $REV_S$ reverse engineers a driver in 10-20 minutes per driver, during which time it explores on the order of 10 thousand paths and processes the resulting traces. In summary, $S^2E$ may be leveraged to rewrite a complex piece of a reverse engineering tool in 73 times less time, using substantially less code, according to one or more embodiments.

To further demonstrate $S^2E$'s generality, it may be used it to develop $PROF_S$, a tool that hadn't been built before: a multi-path in vivo performance profiler and debugger, according to one or more embodiments. This is the first time a form of symbolic execution has been employed for performance analysis. $PROF_S$ allows users to measure instruction count, cache misses, TLB misses, and page faults for arbitrary memory hierarchies, with flexibility to combine any number of cache levels, size, associativity, line sizes, etc. To build $PROF_S$, the PerformanceProfile plugin was developed, which has since become part of $S^2E$. PerformanceProfile counts the number of instructions along each path and, for read and write operations, it simulates the behavior of the desired cache hierarchy and counts misses and hits.

The first $PROF_S$ experiment analyzes the distribution of instruction counts and cache misses for Apache's URL parser. In particular, this experiment was carried out to check for any opportunity for a denial-of-service attack on the Apache web server via carefully constructed URLs. The analysis ran under local consistency for 9.5 hours, and explored 5,515 different paths through the code. Of the 9.5 hours, 2.5 hours were spent in the constraint solver and 6 hours were spent running concrete code. In this experiment, the analysis is very high-overhead, because it simulated 3 different caches and the TLB. We found each path involved in parsing a URL to take on the order of $4.3 \times 10^6$ instructions, with one interesting feature: for every additional "/" character present in the URL, there are 10 extra instructions being executed. We found no upper bound on the execution of URL parsing: a URL containing n+k "/" characters will take 10×k more instructions to execute than a URL with n "/" characters. The total number of cache misses on each path was amazing predictable at 15,984±20. These are examples of the kinds of behavioral insights one can obtain with a multi-path performance analyzer.

A second class of experiments determines the performance envelope in terms of instructions executed, cache misses, and page faults for the ubiquitous ping program. This program is on the order of 1.3 KLOC in size, which is about twice the average size of programs tested with KLEE. The performance analysis ran under local consistency, explored 1,250 different paths, and ran for 5.9 hours. Unlike the URL parsing case, almost 5.8 hours of the analysis were spent in the constraint solver—the first 1,000 paths were explored during the first 3 hours, after which the exploration rate slowed down. The analysis did not find a bound on execution time, and pointed to a path that could go around a loop without bound. Indeed, there is a bug in ping that allows a pinged host to respond with a specially crafted packet that will cause the ping client to run in an infinite loop. In particular, the reply packet just needs to add the record route option in the IP header and set the option length to the minimum value (3 bytes). This will cause there to be no room to store IP addresses, so it will reach the client with an empty list of addresses in the RR option. This is an example where a performance analysis identified a performance bug that some may consider a security bug. Once the bug was fixed, the performance envelope was found to consist of a minimum of 1,645 instructions executed and a maximum of 129,086 instructions (this maximum reached $1.5 \times 10^6$ with the bug and continued growing).

$PROF_S$ is used to find the inputs for best-case performance without enumerating all paths. For this, the PerformanceProfile plugin is used to keep track of the current lower bound (for instructions, page faults, etc.) across all paths (partly)

explored so far; any time a path exceeds this minimum, its exploration is automatically abandoned. This modification makes use of the PathKiller selector. This type of functionality can be used, for example to efficiently (and automatically) determine workloads that make a system perform at its best; it is an example of what can be done only using multi-path analysis.

$S^2E$ may be used to build a profiling tool that offers facilities that are not available in other profilers, according to one or more embodiments. Unlike Valgrind-type tools, $PROF_S$ performs its analyses along multiple paths at a time, not just one, and can measure the effects of the OS kernel on the program's cache behavior and vice versa, not just the program in isolation. Although tools like Oprofile can perform in vivo measurements, but not multi-path, they are based on sampling, so they lack the precision of $PROF_S$. It is impossible, for instance, to count the exact number of cache misses in an execution. All these improvements over state-of-the-art tools come "for free" by using $S^2E$.

$S^2E$ may be used to implement powerful security analysis tools that reason about multiple paths according to one or more embodiments. Such tools may verify whether some piece of information can ever leak outside a restricted region of a program, operating system, or hardware device. By marking the sensitive data symbolic and letting $S^2E$ propagate this data across the system during symbolic execution, it is possible to determine all the places where the data flows to, flag an error when the symbolic data escapes the restricted regions, and provide an explanation of how it escapes. This multi-path data and control flow analysis may be used, among other things, to strip sensitive information from bug reports, detect various kinds of overflows, analyze malware, or prove the security of programs, according to one or more embodiments.

$S^2E$ may be used to validate hardware-based models before synthesizing the actual chip, according to one or more embodiments. It may symbolically execute the hardware model written in a suitable language together with its driver, according to one or more embodiments. $S^2E$ may be used to analyze the power consumption of programs, according to one or more embodiments. $S^2E$ may compute the power usage along each path and point out those that consume too much energy, according to one or more embodiments. The developer may use this information to optimize the program. $S^2E$ may be used for end-to-end certification of binaries, according to one or more embodiments. For example, $S^2E$ may check that specified safety properties hold along the paths of interest, according to one or more embodiments. It may not be necessary for the end-user to trust the compiler that generated the code, since the user may directly check the binary with $S^2E$, according to one or more embodiments.

The measure of how total running time, memory usage, and path coverage efficiency may be influenced by the choice of model and the types of analyses that are appropriate for each model that is disclosed, according to one or more embodiments. The tradeoffs using both a kernel-mode binary (the SMSC 91C111 network driver) and a user-mode binary (the interpreter for the Lua embedded scripting language) is also disclosed. The SMSC driver binary has 19 KB; the symbolic domain includes of the driver, and the concrete domain is everything else. Lua has 12.7 KLOC; the concrete domain is the environment plus the lexer and parser (2 KLOC), while the symbolic domain is the remaining code (Lua interpreter, etc.). Parsers are the bane of symbolic execution engines, because they have many possible execution paths of which only a minute fraction are paths that pass the parsing/lexing stage; the separation for Lua analysis illustrates how, through selective symbolic execution, $S^2E$ may be able to easily run analyses past the parsing/lexing stage, according to one or more embodiments.

Figure 8:
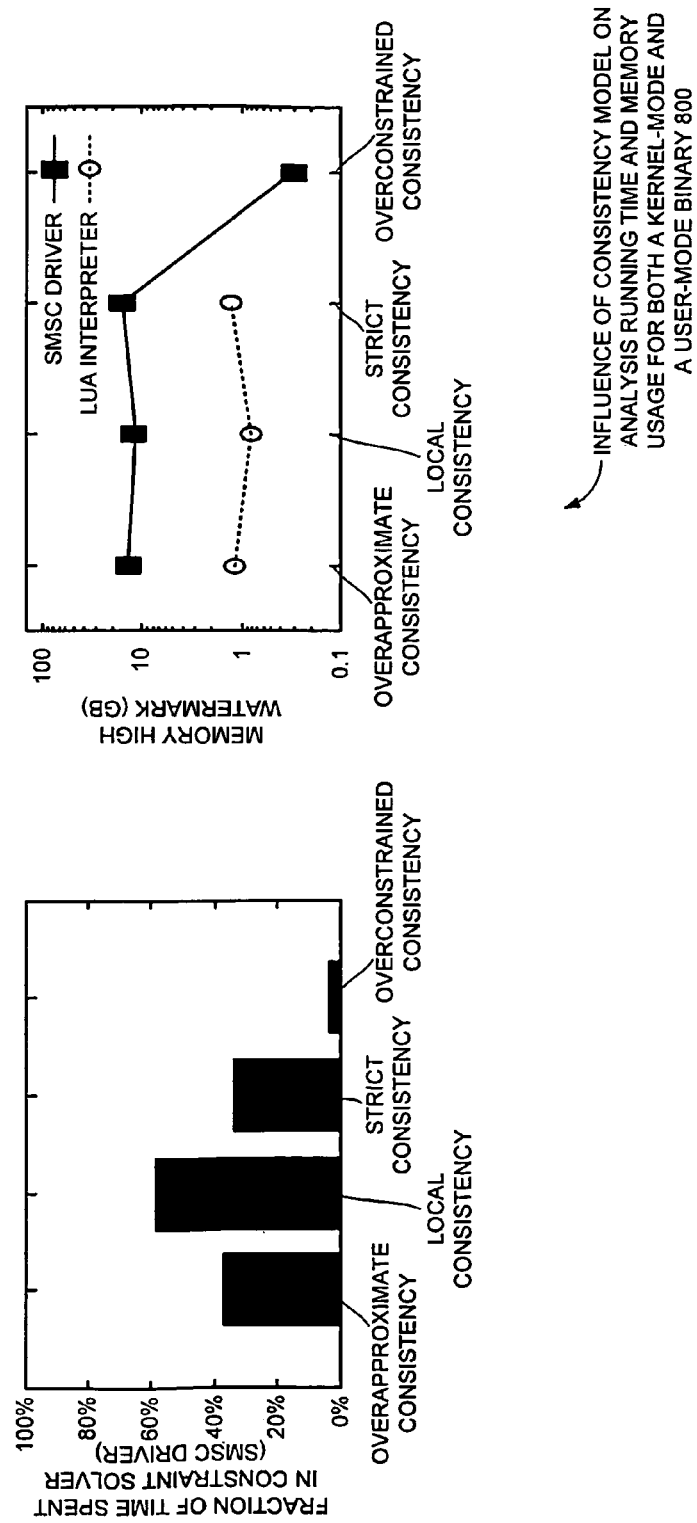
FIG. 8 is a graphical illustration of the influence of a consistency model on analysis running time and memory usage for both a kernel-mode and a user-mode binary, according to one or more embodiments.

FIG. 8 illustrates the influence of consistency model on resource utilization, according to one or more embodiments. For example, switching from strict consistency to over-constrained consistency in the case of the SMSC driver may reduce memory consumption by an order of magnitude. The constraint solver frequently dominates execution time, which suggests that any time one can reduce either the number or complexity of formulas passed to the constraint solver, major savings can be had. The relationship between consistency model and constraint solving very much depends on the structure of the system being analyzed—generally, the deeper a path, the more complex the corresponding path constraints are. Some $S^2E$ optimizations may also factor in, e.g., lazy concretization makes strict consistency substantially cheaper in FIG. 8 than the user would expect, according to one or more embodiments.

Figure 9:
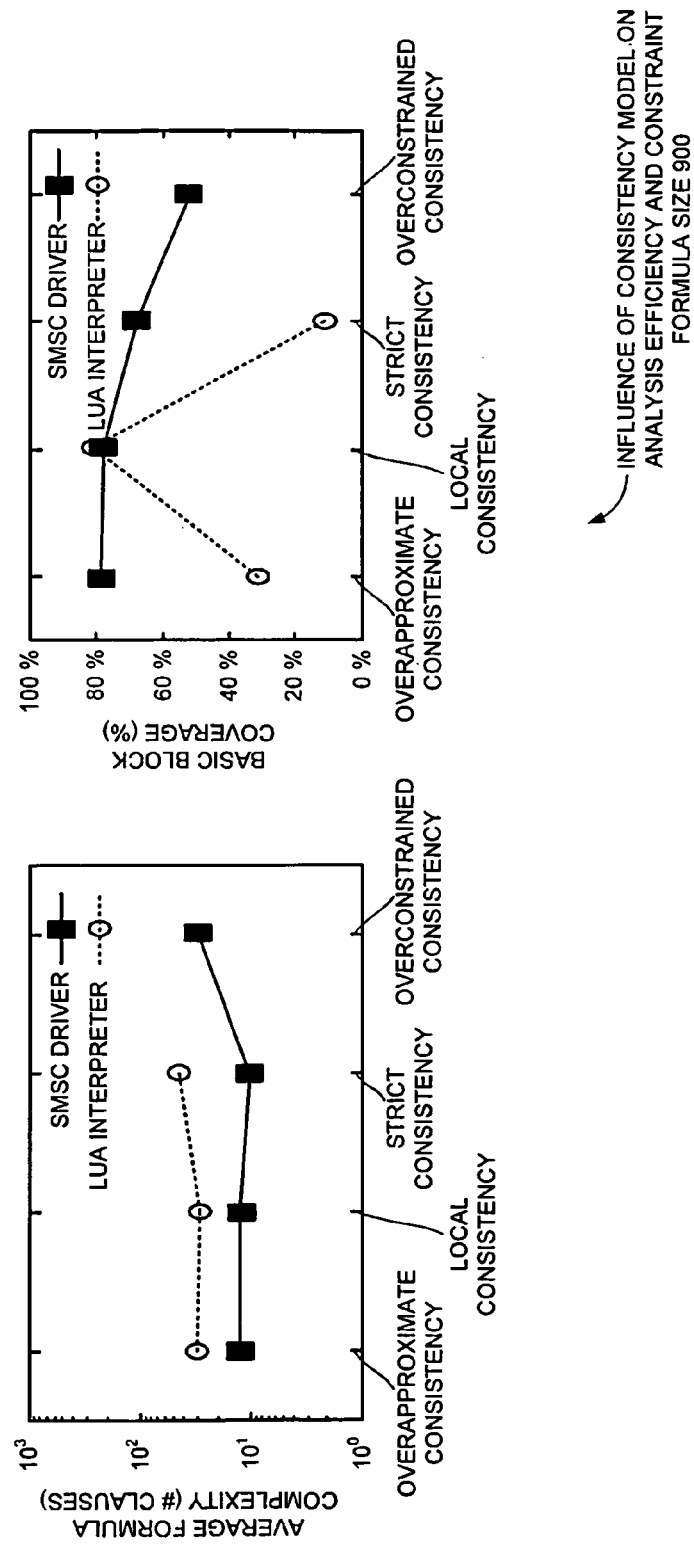
FIG. 9 is a graphical illustration of the influence of a consistency model on analysis efficiency and constraint formula size, according to one or more embodiments.

FIG. 9 illustrates the influence of consistency on constraint complexity, and in particular the influence is noticeable when going from strict to over-constrained consistency, according to one or more embodiments. The influence on coverage experiences an anomaly in the case of Lua under overapproximate consistency: path exercising was able to quickly reach deeply into the interpreter, where it promptly got stuck in a function with many loop-based paths, so by the time we ended the experiment, coverage was poorer than under local consistency, which did not reach that particular "trap" function. In $S^2E$, the complex interactions with the environment happen transparently, because the VM and KLEE are given the same representation of the CPU registers, memory, I/O devices, etc. This may be a key advantage of the $S^2E$ design, according to one or more embodiments.

Another important design decision may be to employ selective symbolic execution at two levels: the various selectors may allow the user to precisely specify the exact part of the system that may be relevant to the analysis, thus excluding any code that would increase execution time with no added benefit, according to one or more embodiments. Furthermore, $S^2E$ may distinguish even inside the symbolic domain instructions that may execute concretely (e.g., when they do not touch symbolic data), according to one or more embodiments. Finally, lazy concretization may ensure that even instructions that do read symbolic data may be treated as executing concretely, as long as the symbolic data are treated as executing concretely, as long as the symbolic data does not influence control flow, according to one or more embodiments. As a result of all these optimizations, in programs like ping, the application may end up executing $3 \times 10^4$ more x86 instructions in concrete mode that in symbolic mode; these 4 orders of magnitude provide a lower bound on the amount of savings selective symbolic execution brings over classic symbolic execution. It is a lower bound, because executing concretely-running paths symbolically would not only incur more overhead, but could also generate further paths that are not of interest to the analysis (e.g., when code branches inside the concrete domain), according to one or more embodiments.

In conclusion, $S^2E$ is the first time virtualization, dynamic binary translation, and symbolic executions may have been combined for the purpose of generic behavior analysis. $S^2E$ may simultaneously analyze entire families of paths, operate directly on binaries, and operate in vivo, that is, may include in its analysis the entire software stack: user programs, libraries, kernels, drivers, and hardware, according to one or more embodiments. $S^2E$ may use automatic bidirectional symbolic-concrete data conversions and relaxed execution consistency models to achieve scalability, according to one or more embodiments. S²E may enable rapid prototyping of system behavior analysis tools with little effort, reverse engineering tools, and a multi-path cache profiler that is a brand new tool, according to one or more embodiments.

S²E may be used to test a binary software system. This binary software analysis system may comprise a virtual machine, a symbolic execution engine and a modular plugin architecture, according to one or more embodiments. The system may also comprise a data-based path selection, a code-based path selection, a priority-based path selection and/or a user-specified custom path selection, according to one or more embodiments.

The system of analyzing binary software may also comprise a symbolic execution engine to perform multi-path analysis of the binary software, an automatic bidirectional data conversion to switch between a symbolic value and a concrete value and being capable to execute at least one of a concrete to symbolic transition and a symbolic to concrete transition, and at least one execution consistency model to enable at least one of a performance tradeoff and a precision tradeoff, according to one or more embodiments.

The symbolic execution engine may perform the multipath analysis of the binary software such that it may execute and analyze the binary software without modeling its surrounding environment such as an operating system kernel, according to one or more embodiments. The symbolic execution engine may perform the multi-path analysis of the binary software such that it may combine elasticity with virtualization by only executing at least one of a library, the operating system kernel, and a plurality of libraries, according to one or more embodiments. In addition, the symbolic execution engine may perform the multi-path analysis of the binary software such that it may combine elasticity with virtualization by executing one portion of the binary software using symbolic execution and an another portion of the binary software using virtualization, according to one or more embodiments.

The execution consistency model may be a CFG consistency, an overapproximate consistency, a local consistency, an overconstrained consistency or a strict consistency, according to one or more embodiments. The local consistency may further comprise excluding zero or more execution paths that are incompatible with the contract imposed by the interface between a concrete domain and a symbolic domain, according to one or more embodiments. The strict consistency may further comprise excluding zero or more execution paths that are not consistent with the operation of the concrete domain, according to one or more embodiments. The overconstrained consistency may further comprise only one of the execution paths in the concrete domain for every choice of a representative of an equivalence class of execution paths in the symbolic domain, according to one or more embodiments.

The system to test binary software may further comprise implementing the overapproximate consistency such that effects of the concrete domain are converted into an unconstrained symbolic data, according to one or more embodiments. In addition, it may further comprise implementing the strict consistency via an incremental symbolic execution of the concrete domain to preserve execution consistency, according to one or more embodiments.

The method of analyzing a binary software may comprise analyzing a plurality of execution paths using a symbolic execution, executing the binary software along a plurality of execution paths, further analyzing the plurality of execution paths within a software system, operating directly on the binary software by combining virtualization with dynamic binary translation, and performing a multi-path analysis of the binary software, according to one or more embodiments.

A selective symbolic execution to execute the binary software along a plurality of execution paths to check for properties of the binary software may be implemented, according to one or more embodiments. A failure of the binary software along a plurality of execution paths may be detected by checking whether the binary software has permission to access a resource region and tracking a plurality of resource regions to determine which resource region was granted to the binary software, which resource region was revoked from the binary software, and which resource region was never granted in the first place, according to one or more embodiments.

The resource region mentioned above may comprise at least one of a dynamically allocated memory, a buffer passed to the binary software, a global kernel variable, a binary software stack, an executable image area, a hardware-related memory area and an input/output port range, according to one or more embodiments. The binary software may be executed by implementing the selective symbolic execution when an environment such as an operating system kernel or a shell calls an entry point of at least one binary software for transfer of a system state between a concrete phase of execution and a symbolic phase of execution by converting data going into the entry point from a concrete value to a symbolic value according to an annotation, according to one or more embodiments.

An annotation may be one of a concrete-to-symbolic conversion hint, a symbolic-to-concrete conversion hint, a resource allocation hint, and a kernel crash handler hook, according to one or more embodiments. The concrete-to-symbolic conversion hint may apply to the binary software's entry point argument and to values returned by a kernel function called by the binary software. The symbolic-to-concrete conversion hint may specify an allowed set of values for arguments to a kernel function called by the binary software, according to one or more embodiments. The resource allocation hint may specify whether at least one of invoking the binary software's entry point and calling the kernel function grants the binary software's access to a resource region, according to one or more embodiments. The resource allocation hint may specify whether at least one of invoking the binary software's entry point and calling the kernel function revokes the binary software's access to the resource region, according to one or more embodiments.

The binary software may be executed by producing a symbolic interrupt and to further produce the symbolic value upon reading from at least one of a symbolic hardware register and DMA memory, according to one or more embodiments. A collection of traces may be produced from the plurality of execution paths leading to the failures and information to replay the execution path allowing for the reproduction of the failures on at least one of a virtual machine and a physical machine, according to one or more embodiments. A simultaneous access to the plurality of execution paths by the symbolic execution may the detection of an infinite loop, according to one or more embodiments. The binary software testing method described herein may further comprise a modular plugin architecture and a verification tool, according to one or more embodiments. It may also include an on-demand concretization such that the symbolic value that is not accessed is not concretized, according to one or more embodiments.

S²E may also be used for device driver testing, according to one or more embodiments. In one embodiment, DDT, a device driver testing system, may use selective symbolic execution to explore the device driver's execution paths and checks for undesired behavior such as crashing the kernel or overflowing a buffer that could be caused by these paths. For each suspected case of bad behavior, DDT may produce a replay-able trace that may be replayed, of the execution that led to the bug, according to one or more embodiments. This provides the consumer irrefutable evidence of the problem. The trace can be re-executed on its own, or inside a debugger, according to one or more embodiments.

DDT currently works for Windows® device drivers. DDT was applied to six popular binary drivers, finding 14 bugs with relatively little effort. These include race conditions, memory bugs, use of unchecked parameters, and resource leaks, all leading to kernel crashes or hangs. Since DDT found bugs in drivers that have successfully passed Microsoft certification, it is believed that it may be used to improve the driver certification process.

Two contributions are made here: The first is a system that, for the first time, may thoroughly and automatically test closed source binary drivers, without access to the corresponding hardware device, according to one or more embodiments. The second contribution is the concept of fully symbolic hardware including symbolic interrupts and demonstration of its use for testing kernel-mode binaries, according to one or more embodiments.

DDT takes as input a binary device driver and outputs a report of found bugs, along with execution traces for each bug, according to one or more embodiments. The input driver is loaded in its native, unmodified environment, which consists of the OS kernel and the rest of the software stack above it. DDT then may automatically exercises the driver along as many code paths as possible, and checks for undesired properties, according to one or more embodiments. When an error or misbehavior is detected, DDT may log the details of the path exploration along with an executable trace that can be used for debugging, or merely as evidence to prove the presence of the bug, according to one or more embodiments.

Figure 10:
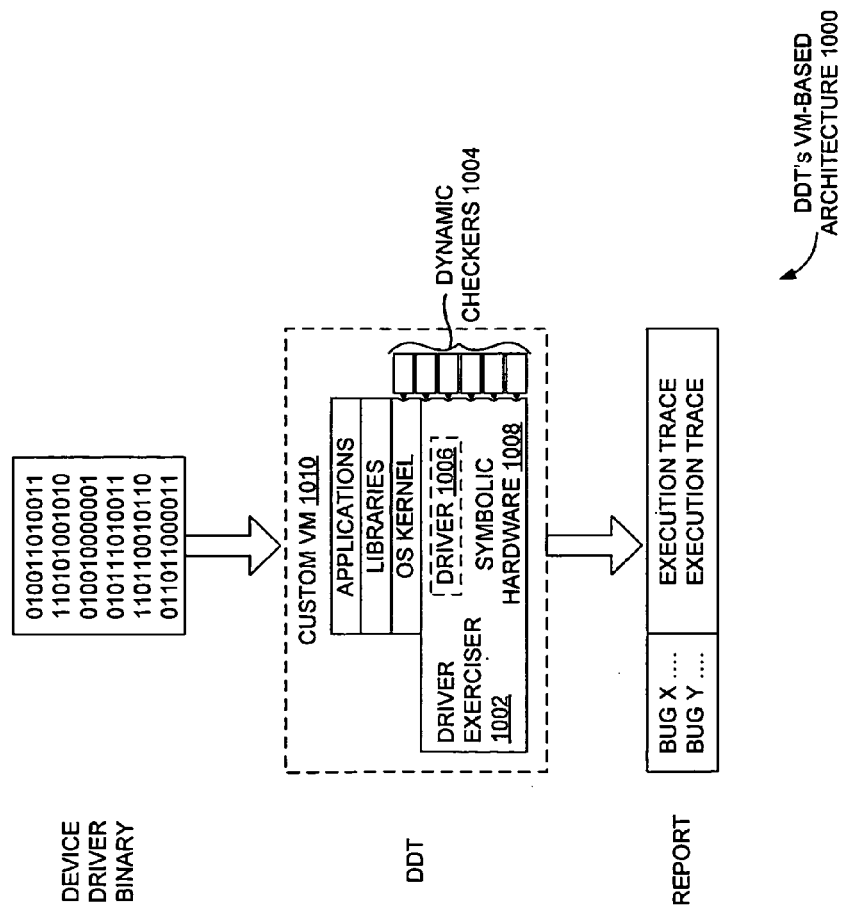
FIG. 10 illustrates DDT's Virtual Machine-based architecture along with other components, according to one or more embodiments.

FIG. 10 illustrates DDT's Virtual Machine (100) based architecture along with other components, according to one or more embodiments. DDT has two main components: a set of pluggable dynamic bug checkers (104) and a driver exerciser (102). The exerciser takes care of steering the driver (106) down various execution paths and the dynamic checkers oversee the execution and raise a flag when undesired behavior is seen along the executed paths. When a bug is spotted, they ask the exerciser to produce information on how to reach that same situation again, according to one or more embodiments.

DDT provides a default set of checkers, and this set can be extended with an arbitrary number of other checkers for both safety and liveness properties, according to one or more embodiments. Currently, DDT detects the following types of bugs: memory access errors, including buffer overflows; race conditions and deadlocks; incorrectly handled interrupts; accesses to pageable memory when page faults are not allowed; memory leaks and other resource leaks; mishandled I/O requests (e.g., setting various I/O completion flags incorrectly); any action leading to kernel panic; and incorrect uses of kernel APIs, according to one or more embodiments. These default checkers catch the majority of defects in the field. A Microsoft report found that, often, drivers crash the system due to not checking for error conditions following a call to the kernel. It is hypothesized that this is due to programmers using the copy-paste function for code from the device driver development kit's succinct examples.

DDT uses selective symbolic execution of the driver binary to automatically take the driver down as many paths as possible; the checkers verify desired properties along these paths according to one or more embodiments. Symbolic execution consists of providing a program with symbolic inputs (e.g., $\alpha$ or $\beta$) instead of concrete ones (e.g., 6 or "abc"), and letting these values propagate as the program executes, while tracking path constraints (e.g., $\beta=\alpha+5$). When a symbolic value is used to decide the direction of a conditional branch, symbolic execution explores all feasible alternatives. On each branch, a suitable path constraint is added on the symbolic value to ensure its set of possible values satisfies the branch condition (e.g. b<0). Selective symbolic execution may enable the symbolic execution of one piece of the software stack while the rest of the software runs concretely, according to one or more embodiments.

A key challenge is keeping the symbolic and the concrete portions of the execution synchronized. DDT supplies the driver with symbolic values on the calls from the kernel to the driver as well as on the returns from the hardware to the driver, thus enabling an underlying symbolic execution engine to steer the driver on the various possible paths. When the driver returns values to a kernel-originated call, or when the driver calls into the kernel, parameters and driver are converted so that execution remains consistent, despite the alternation of symbolic and concrete execution. DDT's fully symbolic hardware (108) enables testing drivers even when the corresponding hardware device is not available. DDT never calls the actual hardware, but instead replaces all hardware reads with symbolic values, and discards all writes to hardware. Being able to test a driver without access to the hardware is useful, for example, for certification companies that cannot buy all the hardware variants for the drivers they test, or for consumers who would rather defer purchasing the device until they are convinced the driver is trustworthy.

Symbolic hardware may also enable DDT to explore paths that are hard to test without simulators or specialized hardware, according to one or more embodiments. For example, many devices rely on interrupts to signal completion of operations to the device driver. DDT uses symbolic interrupts to inject such events at the various crucial points during the execution of the driver, according to one or more embodiments. Symbolic interrupts allow DDT to test different code interleavings and detect bugs. DDT may provide evidence of the bug and the means to debug it: a complete trace of the execution plus concrete inputs and system events that make the driver re-execute the buggy path in a regular, non-DDT environment, according to one or more embodiments.

DDT uses two methods to detect failures along exercised paths: dynamic verification done by DDT's virtual machine and failure detection inside the guest OS, according to one or more embodiments. VM-level checks are targeted at properties that require either instrumentation of driver code instructions or reasoning about multiple paths at a time. Guest OS level checks leverage existing stress-testing and verification tools to catch bugs that require deeper knowledge of the kernel APIs. Most guest OS-level checks can be performed at the VM level as well, but it is often more convenient to write and deploy OS-level checkers, according to one or more embodiments.

Memory access verification in DDT is done at the VM level, according to one or more embodiments. On each memory access, DDT checks whether the driver has sufficient permissions to access that memory. For the purpose of access verification, DDT treats the following memory regions as accessible to drivers: dynamically allocated memory and buffers; buffers passed to the driver, such as network packets or strings from the Windows® registry; global kernel variables that are implicitly accessible to drivers; current driver stack; executable image area, i.e., loadable sections of the driver binary with corresponding permissions and hardware-related memory areas (memory-mapped), according to one or more embodiments.

In order to track these memory regions, DDT hooks the kernel API functions and driver entry points, according to one or more embodiments. Every time the hooked functions are called, DDT analyzes their arguments to determine which memory was granted to (or revoked from) the driver. Beyond memory safety, DDT's simultaneous access to multiple execution paths (by virtue of employing symbolic execution) enables the implementation of bug detection techniques that reason about the code globally in terms of paths, such as infinite loop detection, according to one or more embodiments.

For guest OS level checks, DDT may reuse off-the-shelf runtime verification tools, according to one or more embodiments. These tools perform in-guest checking, oblivious to exactly how the driver is being driven along the observed execution paths. Since these tools are usually written by OS developers, they can detect errors that require deep knowledge of the OS and its driver API. When they find a bug, these dynamic tools typically crash the system to produce an error report containing a memory dump. DDT intercepts such pre-meditated crashes and reports the bug information to the user. DDT helps the runtime checkers find more bugs than they would under normal concrete execution, because it symbolically executes the driver along many more paths, according to one or more embodiments.

Also, DDT's modular architecture from FIG. 10 allows reusing such tools without adaptation or porting, according to one or more embodiments. This means that driver developers' custom test suites can also be readily employed. Moreover, given DDT's design, such tools may be inserted at any level in the software stack, either in the form of device drivers or as software applications. DDT may also automatically leverage kernel assertion checks, when they are present, according to one or more embodiments.

DDT implements selective symbolic execution, a technique for seamless transfer of system state between symbolic and concrete phases of execution, according to one or more embodiments. DDT obtains similar properties to running the entire system symbolically, while in fact only running the driver symbolically. The transfer of state between phases is governed by a set of conversion hints, discussed later. Using selective symbolic execution enables DDT to execute the driver within its actual environment, as opposed to requiring potentially incomplete models thereof, according to one or more embodiments. A typical driver is composed of several entry points. When the OS loads the driver, it calls its main entry point, similarly to a shell invoking the main ( ) function of a program. This entry point registers with the kernel the driver's other entry points.

When the kernel calls a driver's entry point, DDT transfers system state to a symbolic execution engine, according to one or more embodiments. It converts entry point arguments, and possibly other parts of concrete system state, to symbolic values. For example, when the kernel calls the 'SendPacket' function in a NIC driver, DDT makes the content of the network packet symbolic, to explore all the paths that depend on the packet's type. When a driver calls a kernel function, DDT selects feasible values (at random) for its symbolic arguments. For example, DDT selects some concrete value 'len' for the length that satisfies current constraints. However, this concretization subjects all subsequent paths to the constraint that length must equal (len), and this may disable otherwise-feasible paths. Thus, DDT keeps track of all such concretization-related constraints if at some point in the future this constraint limits a choice of paths, DDT backtracks to the point of concretization, forks the entire machine state, and repeats the kernel call with different feasible concrete values, which could re-enable the presently unexplorable path, according to one or more embodiments.

To minimize overhead, DDT does concretization on demand, i.e., delays it as long as possible by tracking symbolic values when executing in concrete mode and concretizing them only when they are actually read, according to one or more embodiments. This way, symbolic values that are not accessed by concretely running code are never concretized. In particular, all private driver state and buffers that are treated as opaque by the kernel end up being preserved in their symbolic form, according to one or more embodiments.

DDT requires neither real hardware nor hardware models to test drivers—instead, DDT uses symbolic hardware, according to one or more embodiments. A symbolic device in DDT ignores all writes to its registers and produces symbolic values in response to reads. These symbolic values may cause drivers to explore paths that depend on the device output. Symbolic hardware produces symbolic interrupts, i.e., interrupts with a symbolic arrival time. Reasoning about interrupt arrival symbolically offers similar benefits to reasoning about program inputs symbolically: the majority of interrupt arrival times are equivalent to each other, so only one arrival time in each equivalence class need be produced. If a block of code does not read/write system state that is also read/written by the interrupt handler, then executing the interrupt handler at any point during the execution of that block has the same end result. Currently, DDT implements a simplified model of symbolic interrupts. It symbolically delivers interrupts on each crossing of the kernel/driver boundary (i.e., before and after each kernel API call, and before and after each driver entry point execution). This strategy produces good results because many important changes in driver state are related to crossing the kernel/driver interface.

Symbolic hardware with symbolic interrupts may force the driver on paths that are not possible in reality with correct hardware, according to one or more embodiments. For example, a symbolic interrupt may be issued after the driver instructed the device not to issue interrupts (e.g., by writing a control register). A correctly functioning device will therefore not deliver that interrupt. The natural solution would be to include the enabled/disabled interrupts status in the path constraints, and prevent interrupts from occurring when this is not possible. However, recent work has shown that hardware often malfunctions, and that drivers must be sufficiently robust to handle such behavior anyway.

More generally, DDT's ability to test drivers against hardware failures is important, because chipsets often get revised without the drivers being suitably updated. Consider a device that returns a value used by the driver as an array index. If the driver does not check the bounds and a revised version of the chipset later returns a greater value, then the obsolete driver could experience an out-of-bounds error.

Device drivers run at the bottom of the software stack sandwiched between the kernel and hardware devices. The layers surrounding a driver are complex, and the different classes of device drivers use many different kernel subsystems. For instance, network, audio, and graphics drivers each use different kernel services and interfaces. If one wanted to run drivers in isolation, then an abstraction layer between the layers and the rest of the stack would be required, and building this layer is non-trivial. For example, testing a network driver would require the testbed to provide well-formed data structures when returning from a packet allocation function called by the driver.

DDT tests drivers by symbolically executing them in conjunction with the real kernel binary, according to one or more embodiments. By using the actual software stack (and thus the real kernel) instead of a simplified abstract model of it, DDT ensures that the device drivers get tested with the exact kernel behavior they would experience in reality, according to one or more embodiments. To this end, DDT needs to mediate the interactions with the layers around the driver in a way that keeps the symbolic execution of the driver consistent with the concrete execution of the kernel. DDT performs various conversions between the symbolic and concrete domains, according to one or more embodiments. In its default mode, in which no annotations are used, DDT converts symbolic arguments passed to kernel functions into legal random concrete values and uses symbolic hardware, including symbolic interrupts, according to one or more embodiments. Driver entry point arguments are not touched. These conversions, however, can be fine-tuned by annotating API functions and driver entry points.

DDT provides ways for developers to encode their knowledge of the driver/kernel API in annotations that improve DDT's achievable code coverage and bug finding abilities, according to one or more embodiments. Annotations may allow DDT to detect not only low-level errors, but also logical bugs, according to one or more embodiments. Annotations are a one-time effort on the part of OS developers, testers, or a broader developer community. DDT's annotations are lighter weight and substantially easier to write and keep up-to-date than the API models used by previous tools: preparing DDT annotation for the whole NDIS API took about two weeks of on-and-off effort; preparing annotations for those 54 functions in the WDM API that were used by our sound drivers took one day.

DDT annotations are written in C and compiled to LLVM bit code, which is then loaded by DDT at runtime and run in the context of QEMU-translated code, when necessary. The annotation code has direct access to, and control over, the guest system's state. Additionally, it can use a special API provided by DDT to create symbolic values and/or manipulate execution state.

DDT annotations fall into four categories: Concrete-to-symbolic conversion hints apply to driver entry points' arguments and to return values from kernel functions called by the driver, according to one or more embodiments. They encode contracts about what constitute reasonable arguments or return values. The absence of this kind of conversion hints will cause DDT not to try all reasonable classes of values, which results solely in decreased coverage, i.e., false negatives.

Symbolic-to-concrete conversion hints specify the allowed set of values for arguments to kernel API functions called by drivers, according to one or more embodiments. They include various API usage rules that, if violated, may lead to crashes or data corruption. When a call to such an annotated function occurs, DDT verifies that all incorrect argument values are ruled out by the constraints on the current path; if not, it flags a potential bug. The absence of such annotations can lead DDT to concretize arguments into some values that are consistent with the path constraints (thus feasible in a real execution) but not uncover potential bugs (if values happen to be OK according to the unspecified API usage rules). In other words, they can lead to false negatives, but not to false positives.

Resource allocation hints specify whether invoking an entry point or calling a kernel function grants or revokes the driver's access to any memory or other resources, according to one or more embodiments. This information is used to verify that the driver accesses only resources that the kernel explicitly allows into access. It is also used to verify that all allocated resources are freed on exit paths. The absence of memory allocation hints can lead to false positives, but can be avoided, if necessary, by switching to a coarsegrained memory access verification scheme (as used, for instance in Microsoft's Driver Verifier.

The Kernel crash handler hook annotation informs DDT of the address of the guest kernel's crash handler, as well as how to extract the crash information from memory, according to one or more embodiments. This annotation enables DDT to intercept all crashes when running the kernel concretely, such as the "blue screen of death" (BSOD). This annotation is relied upon in the DDT prototype to cooperate with the Microsoft Driver Verifier's dynamic checkers.

An alternative approach to ensuring device driver quality is stress testing, which is how Microsoft certifies its third party drivers. However, this does not catch all bugs. Even Microsoft-certified drivers shipped with Windows have bugs that cause the kernel to crash. However, powerful static analysis tools can reason about corner-case conditions by abstracting the driver under test, without actually running it. Since static analysis does not run any code per se, it requires modeling the driver's environment. Environment modeling generally does not scale, because kernels are large and evolve constantly. Modeling the kernel/driver API requires manual effort and is error prone. Developing around 60 API usage rules for testing Windows device drivers took more than three years. It also required many iterations of refinement based on false positives found during evaluation. In the end, the resulting models are only an approximation of the original kernel code, thus leading to both false negatives and, more importantly, false positives. A test tool that produces frequent false positives discourages developers from using it.

In contrast, inventors find DDT's annotations to be straightforward and easy to maintain. Moreover, if they are perceived by developers as too high of a burden, then DDT can be used in its default mode; without annotations. Testing device drivers often requires access to either the physical device or a detailed model of it. For drivers that support several physical devices, testing must be repeated for each such device. In contrast, symbolic hardware enables not only testing drivers without a physical device, but also testing them against hardware bugs or corner cases that are hard to produce with a real device, according to one or more embodiments.

When DDT finishes testing a driver, it produces a detailed report containing all the bugs it found, according to one or more embodiments. This report consists of all faulty execution paths and contains enough information to accurately replay the execution, allowing the bug to be reproduced on the developer's or consumer's machine. DDT's bug report is a collection of traces of the execution paths leading to the bugs, according to one or more embodiments. These traces contain the list of program counters of the executed instructions up to the bug occurrence, all memory accesses done by each instruction (address and value) and the type of the access (read or write). Traces contain information about creation and propagation of all symbolic values and constraints on branches taken. Each branch instruction has a flag indicating whether it forked execution or not, thus enabling DDT to subsequently reconstruct an execution tree of the explored paths; each node in the tree corresponds to a machine state. Finally, DDT associates with each failed path a set of concrete inputs and system events (e.g., interrupts) that take the driver along that path. The inputs are derived from the symbolic state by solving the corresponding path constraint, according to one or more embodiments.

A DDT trace has enough information to replay the bug in the DDT VM, according to one or more embodiments. Each trace starts from an initial state (a "hibernated" snapshot of the system) and contains the exact sequence of instructions and memory accesses leading to the crash or hang. The traces are self-contained and directly executable. The size of these traces rarely exceeds 1 MB per bug, and usually they are much smaller. DDT traces can easily be traced to work with existing VM replay tools. DDT also post-processes these traces off-line, to produce a palatable error report. DDT reconstructs the tree of execution paths and, for each leaf state that triggered a bug it unwinds the execution path by traversing the execution tree to the root, according to one or more embodiments. Then it presents the corresponding execution path to the developer.

When driver source code is available, DDT-produced execution paths can be automatically mapped to source code lines and variables, to help developers better visualize the buggy behavior, according to one or more embodiments. For bugs leading to crashes, it is also possible to extract a Windows® crash dump that can be analyzed with WinDbg, since each execution state maintained by DDT is a complete snapshot of the system (this includes the disk where the OS saved the crash dump). It is also worth noting that DDT execution traces can help debuggers go backwards through the buggy execution, according to one or more embodiments.

In theory, DDT traces could be directly executed outside the VM (e.g., in a debugger) using a natively executing OS, since the traces constitute slices through the driver code, according to one or more embodiments. The problem, though, is that the physical hardware would need to be coerced into providing the exact same sequence of interrupts as in the trace. Another challenge is providing the same input and return values to kernel calls made by the driver—here DDT could leverage existing hooking techniques to intercept and modify these calls during replay. Finally, replaying on a real machine would involve triggering asynchronous events at points equivalent to those saved in the traces.

Replaying input from the hardware may be done by programming an FPGA-based device (or other kinds of reprogrammable devices) to make it emulate parts of the original device, according to one or more embodiments. Emulating the original device would allow the reprogrammable device to provide the right input to the driver (e.g., I/O, DMA, interrupts . . . ) during replay. In other words, the programmable device becomes the "mirror" of the driver that gives back the input expected by the driver, just as if it was the real device. Programming the FPGA so that it returns the right input does not require any knowledge about the real device's internals, but solely the knowledge of the driver. Not requiring the knowledge about the original device allows one to synthesize the device, or parts of it, based on the original driver. This can be used to reverse engineer a missing device, etc.

Execution traces produced by DDT may also help understand the cause of a bug, according to one or more embodiments. For example, if an assertion of a symbolic condition failed, execution traces can identify on what symbolic values the condition depended, when during the execution they were created, why they were created, and what concrete assignment of symbolic values would cause the assertion to fail. An assertion, bad pointer access, or a call that crashes the kernel might depend indirectly on symbolic values, due to control flow based dependencies; most such cases are also identifiable in the execution traces. Based on device specifications provided by hardware vendors, one can decide whether a bug can only occur when a device malfunctions. One could write tools to automate the analysis and classification of bugs found by DDT, even though doing this manually is not hard. They could provide both user-readable messages, like "driver crashes in low memory situations," and detailed technical information, according to one or more embodiments.

DDT can be extended to provide a means of automatically fixing and/or avoiding driver bugs, according to one or more embodiments. DDT may detect paths that cause crashes and steer the driver away from such paths at run-time by dynamically or statically adding checks or using other methods, according to one or more embodiments. For example, during symbolic execution, if some inputs cause a crash, DDT could insert in the driver's binary checks for these inputs and return a failure code to the OS in case of a match, according to one or more embodiments. These checks can be bug-specific, e.g., checks for verifying otherwise unchecked hardware or registry input.

In one embodiment, the implementation of a DDT prototype for Windows® device drivers is shown which can be used by both developers and consumers to test binary drivers before installing them. It is also shown, for example, how to trick Windows® into accepting DDT's symbolic hardware and how to identify and exercise the drivers' entry points. DDT uses a modified QEMU machine emulator together with a modified version of the Klee symbolic execution engine, according to one or more embodiments. DDT can run a complete, unmodified, binary software stack, comprising Windows®, the drivers to be tested, and all associated applications, according to one or more embodiments. QEMU is an open-source machine emulator that supports many different processor architectures, like x86, SPARC®, ARM®, PowerPC, and MIPS®. It emulates the CPU, memory, and devices using dynamic binary translation. QEMU's support of multiple architectures may make DDT available to more than just x86-based platforms, according to one or more embodiments.

DDT embeds an adapted version of Klee, according to one or more embodiments. To symbolically execute a program, one first compiles it to LLVM bit code, which Klee can then interpret. Klee employs various constraint solving optimizations and coverage heuristics, which make it a good match for DDT. To use Klee, QEMU's back-end is extended to generate LLVM bit code. QEMU translates basic blocks from the guest CPU instruction set to a QEMU-specific intermediate representation, according to one or more embodiments. Also, this intermediate representation is translated to LLVM on the fly. The generated LLVM bit code can be directly interpreted by Klee, according to one or more embodiments.

QEMU and KLEE have different representations of program state, which have to be kept separate yet synchronized. In QEMU, the state is composed of the virtual CPU, VM physical memory, and various virtual devices. Also, this data is encapsulated in Klee memory objects, and modified QEMU to use Klee's routines to manipulate the VM's physical memory. Thus, whenever the state of the CPU is changed (e.g., register written) or a device is accessed (e.g., interrupt controller registers are set), both QEMU and Klee see it, and Klee can perform symbolic execution in a consistent environment.

Symbolic execution generates path constraints that also have to be synchronized, according to one or more embodiments. Since QEMU and Klee keep a synchronized CPU, device, and memory state, any write to the state by one of them will be reflected in the path constraints kept by Klee. For example, when symbolically executing driver code accesses concrete kernel memory, it sees data consistent with its own execution so far. Conversely, when concrete code attempts to access a symbolic memory location, that location is automatically concretized, and a corresponding constraint is added to the current path. Data written by concrete code is seen as concrete by symbolically running driver code.

QEMU runs in a loop, continuously fetching guest code blocks, translating them, and running them on the host CPU or in Klee. When a basic block is fetched, DDT checks whether the program counter is inside the driver of interest or not, according to one or more embodiments. If yes, QEMU generates a block of LLVM code and passes it to Klee; otherwise, it generates x86 machine code and sends it to the host processor.

DDT may monitor kernel code execution and parses kernel data structures to detect driver load attempts, according to one or more embodiments. DDT catches the execution of the OS code responsible for invoking the load entry point of device drivers. If the name of the driver corresponds to the one being monitored, DDT further parses the corresponding data structures to retrieve the code and data segment locations of the driver. Parsing the data structures is done transparently, by probing the virtual address space, without causing any side effects. When the driver is executed with symbolic inputs, DDT forks execution paths as it encounters conditional branches. Forking consists primarily of making a copy of the contents of the CPU, the memory, and the devices, to make it possible to resume the execution from that state at a later time. In other words, each execution state consists conceptually of a complete system snapshot, according to one or more embodiments.

Since symbolic execution can produce large execution trees (exponential in the number of branches), DDT implements various optimizations to handle the large number of states generated by Klee, according to one or more embodiments. Moreover, each state is big, consisting of the entire physical memory and of the various devices (such as the contents of the virtual disk). DDT uses chained copy-on-write: instead of copying the entire state upon an execution fork, DDT creates an empty memory object containing a pointer to the parent object, according to one or more embodiments. All subsequent writes place their values in the empty object, while reads that cannot be resolved locally are forwarded up to the parent. Since quick forking can lead to deep state hierarchies; we cache each resolved read in the leaf state with a pointer to the target memory object, in order to avoid traversing long chains of pointers through parent objects, according to one or more embodiments.

For PCI devices, the OS allocates resources (memory I/O regions, and interrupt line) for the device, as required the device descriptor, prior to loading the driver, and then writes the addresses of allocated resources to the device's registers. From that point, the device continuously monitors all memory accesses on the memory and I/O buses; when an address matches its allocated address range, the device handles the access. In QEMU, such accesses are handled by read/write functions specific to each virtual device. For DDT symbolic devices, the write functions discard their arguments, and the read function always returns an unconstrained symbolic value, according to one or more embodiments. When DDT decides to inject a symbolic interrupt, it calls the corresponding QEMU function to assert the right interrupt assigned to the symbolic device by the OS, according to one or more embodiments.

The execution of the driver also depends on certain parts of the device descriptor, not just on the device memory and I/O registers. For example, the descriptor may contain a hardware revision number that triggers slightly different behavior in the driver. Unfortunately, the device descriptor is parsed by the OS when selecting the driver and allocating device resources, so DDT cannot just make it symbolic. Instead, as the device drivers access the descriptor through kernel API functions, we use annotations to insert appropriately constrained symbolic results when the driver reads the descriptor, according to one or more embodiments.

In order to fool the driver into accepting symbolic devices, the following method is used, according to one or more embodiments. Hardware buses like PCI and USB support Plug-and-Play, which is a set of mechanisms that modern operating systems use to detect insertion and removal of devices. The bus interface notifies the OS of such events. When the OS detects the presence of a new device, it loads the corresponding driver. The right driver is selected by reading the vendor and device ID of the inserted device. If the driver is for a PCI device, it will typically need to read the rest of the descriptor, i.e., the size of the register space and various I/O ranges. DDT provides a PCI descriptor for a fake device to trick the OS into loading the driver to be tested. The fake device is an empty "shell" consisting of a descriptor containing the vendor and device IDs, as well as resource information. The fake device itself does not implement any logic other than producing symbolic values for read requests. Support for USB is similar: a USB descriptor pointing to a "shell" device is passed to the code implementing the bus, causing the target driver to be loaded.

Hardware descriptors are simple and can be readily obtained. If the actual hardware is available, the descriptors can be read directly from it. If the hardware is not present, it is possible to extract the information from public databases of hardware supported on Linux. If this information is not available, it can be extracted from the driver itself. Work is being done on a technique to automatically determine this information directly from the driver.

DDT may detect that the OS has loaded a driver, determine the driver's entry points, coerce the OS into invoking them, and then symbolically execute them, according to one or more embodiments. DDT automatically detects a driver's entry points by monitoring attempts of the driver to register such entry points with the kernel, according to one or more embodiments. Drivers usually export only one entry point, specified in the driver binary's file header. Upon invocation by the kernel, this routine fills data structures with entry point information and calls a registration function. In a similar way, DDT intercepts the registration of interrupt handlers, according to one or more embodiments. DDT uses Microsoft's Device Path Exerciser as a concrete workload generator to invoke the entry points of the drivers to be tested. Device Path Exerciser is shipped with the Windows® Driver Kit and can be configured to invoke the entry points of a driver in various ways, testing both normal and error situations. Each invoked entry point is symbolically executed by DDT, according to one or more embodiments. To accomplish this, DDT returns symbolic values on hardware register reads and, hooks various functions to inject symbolic data. Since execution can fork on branches within the driver, the execution can return to the OS through many different paths. To save memory and time, DDT terminates paths based on user-configurable criteria (e.g., if the entry point returns with a failure), according to one or more embodiments.

According to one or more embodiments, DDT attempts to maximize driver coverage using pluggable heuristics modules. The default heuristic attempts to maximize basic block coverage. It maintains a global counter for each basic block, indicating how many times the block was executed. The heuristic selects for the next execution step the basic block with the smallest value. This avoids states that are stuck, for instance, in polling loops. Depending on the driver, it is possible to choose different heuristics dynamically. DDT tests for concurrency bugs by injecting symbolic interrupts before and after each kernel function called by the driver. It asserts the virtual interrupt line, causing QEMU to interrupt the execution of the current code and to invoke the OS's interrupt handler. The injection of symbolic interrupts is activated as soon as the target driver registers an interrupt handler for the device.

According to one or more embodiments drivers may legitimately access the kernel's data structures, and this must be taken into account by DDT, to avoid false reports of unauthorized memory accesses. First, drivers access global kernel variables, which must be explicitly imported by the driver; DDT scans the corresponding section of the loaded binary and grants the driver access to them. Second, private kernel data may be accessed via in lined functions. DDT provides annotations for identifying such data structures.

FIG. 11 illustrates the characteristics such as, but not limited to, size of driver binary file and number or called kernel functions of Windows® drivers used to evaluate DDT, according to one or more embodiments. It shows that DDT may be used to test four network drivers and two sound card drivers, which use different Windows® kernel APIs and are written in both C and C++. All drivers are reasonably sized, using tens of API functions; DDT scales well in this regard, mainly due to the fact that it needs no kernel API models.

DDT found bugs in all drivers inventors tested: memory leaks, memory corruptions, segmentation faults, and race conditions. A summary of these findings is illustrated in FIG. 12, which summarizes previously unknown bugs discovered by DDT, according to one or more embodiments. Additionally, DDT produced execution traces that were manually analyzed in order to explain each bug. The analyses took a maximum of 20 minutes per bug. Testing each driver took a maximum of 4 hours, and this time includes adding missing API annotations and occasional debugging of the DDT prototype. From among all bugs found by DDT, only one was related to improper hardware behavior: it was a subtle race condition in the RTL8029 driver, occurring right after the driver registered its interrupt handler, but before it initialized the timer routine and enabled interrupts on the device. If the interrupt fires at this point, the interrupt handler calls a kernel function to which it passes an uninitialized timer descriptor, causing a kernel crash. From the execution traces produced by DDT it was clear that the bug occurred in the driver interrupt handler routine after issuing a symbolic interrupt during driver initialization. The address of the interrupt control register in the device documentation was checked; since the execution traces contained no writes to that register, it was concluded that the crash occurred before the driver enabled interrupts. At the same time, if the device malfunctions and this bug manifests in the field, it is hard to imagine a way in which it could be fixed based on bug reports. It is hard to find this kind of bugs using classic stress-testing tools, even with malfunctioning hardware, because the interrupt might not be triggered by the hardware at exactly the right moment.

Another interesting bug involved memory corruption after parsing parameters (obtained from the registry) in the RTL8029. The driver does not do any bounds checking when reading the Maximum MulticastList parameter during initialization. Later, the value of this parameter is used as an index into a fixed size array. If the parameter has a large (or negative) value, memory corruption ensues and leads to a subsequent kernel panic. This explanation was easily obtained by looking at the execution traces: a faulty memory read was shown at an address equal to the sum of the base address returned by the memory allocator plus an unconstrained symbolic value injected when reading the registry.

An example of a common kind of bug is the incorrect handling of out-of-memory conditions during driver initialization. In the RTL8029, AMD PCNet, and Intel Pro/1000 drivers, such conditions lead to resource leaks: when memory allocation fails, the drivers do not release all the resources that were already allocated (heap memory, packet buffers, and configuration handlers). In the Ensoniq Audio PCI driver, failed memory allocation leads to a segmentation fault, because the driver checks whether the memory allocation failed, but later uses the returned null pointer on an error handling path, despite the fact that the initial check failed. An example of incorrectly used kernel API functions is a bug in the Intel Pro/100 driver. These bugs were tried to be recovered with the Microsoft Driver Verifier running the driver concretely, but none were found. Furthermore, since Driver Verifier crashes by default on the first bug found, looking for the next bug would typically require first fixing the found bug.

In contrast, DDT may find multiple bugs in one run, according to one or more embodiments. To assess the influence that annotations have on DDT's effectiveness, these drivers may be re-tested with all annotations turned off. All the race condition bugs may be reproduced, because their detection does not depend on the annotations. Hardware related bugs may be also found, caused by improper checks on hardware registers. However, removing the annotations may result in decreased code coverage, which may result in not finding the memory leaks and the segmentation faults, according to one or more embodiments.

DDT was also compared to the Microsoft SDV tool, a state-of-the-art static analysis tool for drivers. Since SDV requires source code, the Intel Pro/100 network card driver, whose source code appears in the Windows Drivers Development Kit, was used instead. Unfortunately, testing was not possible because the driver uses older versions of the NDIS API that SDV cannot exercise. SDV also requires special entry point annotations in the source code, which were not present in the Intel Pro/100 driver. Instead, the sample drivers shipped with SDV itself were compared: SDV found the 8 sample bugs in 12 minutes, while DDT found all of them in 4 minutes. Additionally, several synthetic bugs were injected in the sample driver (most of these hang the kernel): a deadlock, an out-of-order spinlock release, an extra release of a non-acquired spinlock, a "forgotten" unreleased spinlock and a kernel call at the wrong IRQ level. SDV did not find the first 3 bugs, it found the last 2, and produced 1 false positive. DDT found all 5 bugs and no false positives in less than a third of the time that SDV ran. DDT can test drivers that existing tools cannot handle, and can find more subtle bugs in mature device drivers.

Figure 13:
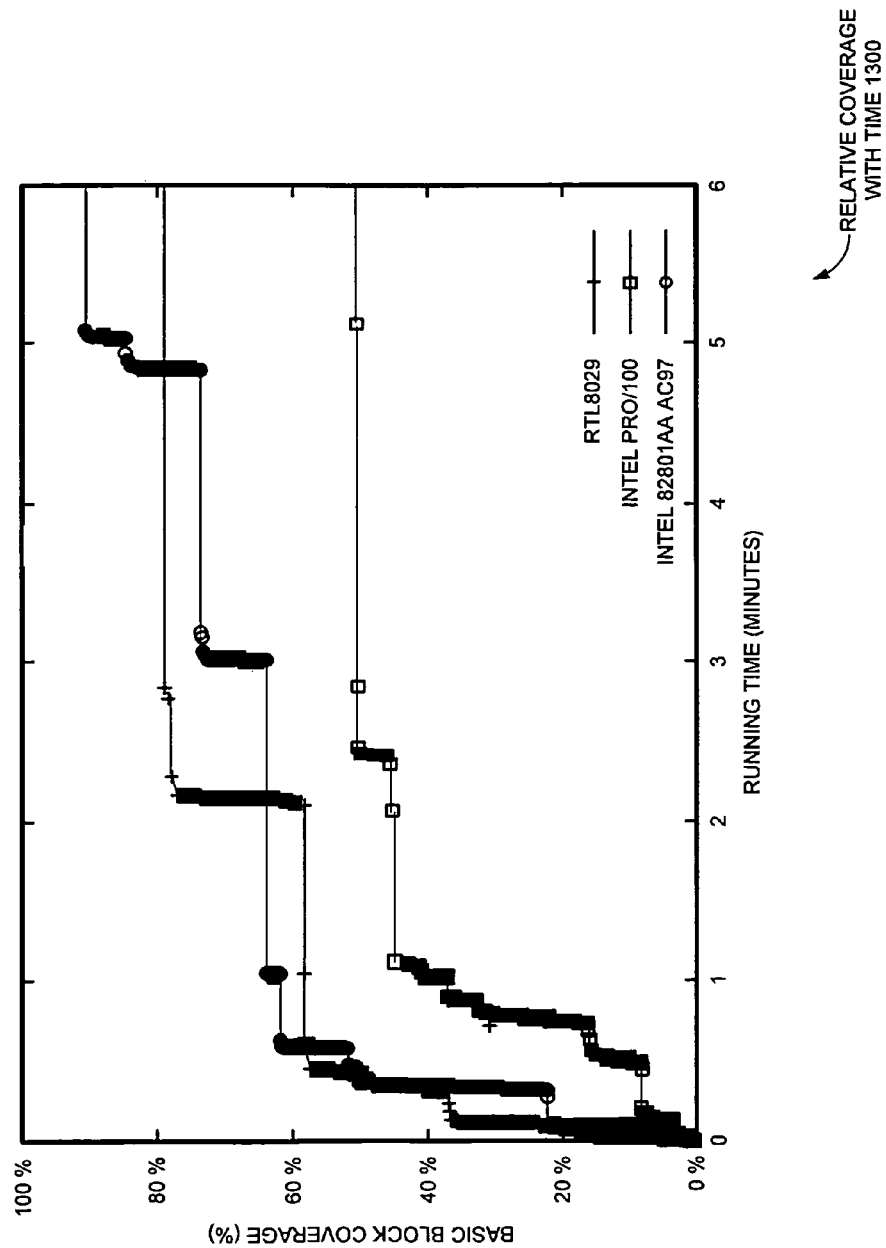
FIG. 13 illustrates a graphical representation of relative coverage with time, according to one or more embodiments.
Figure 14:
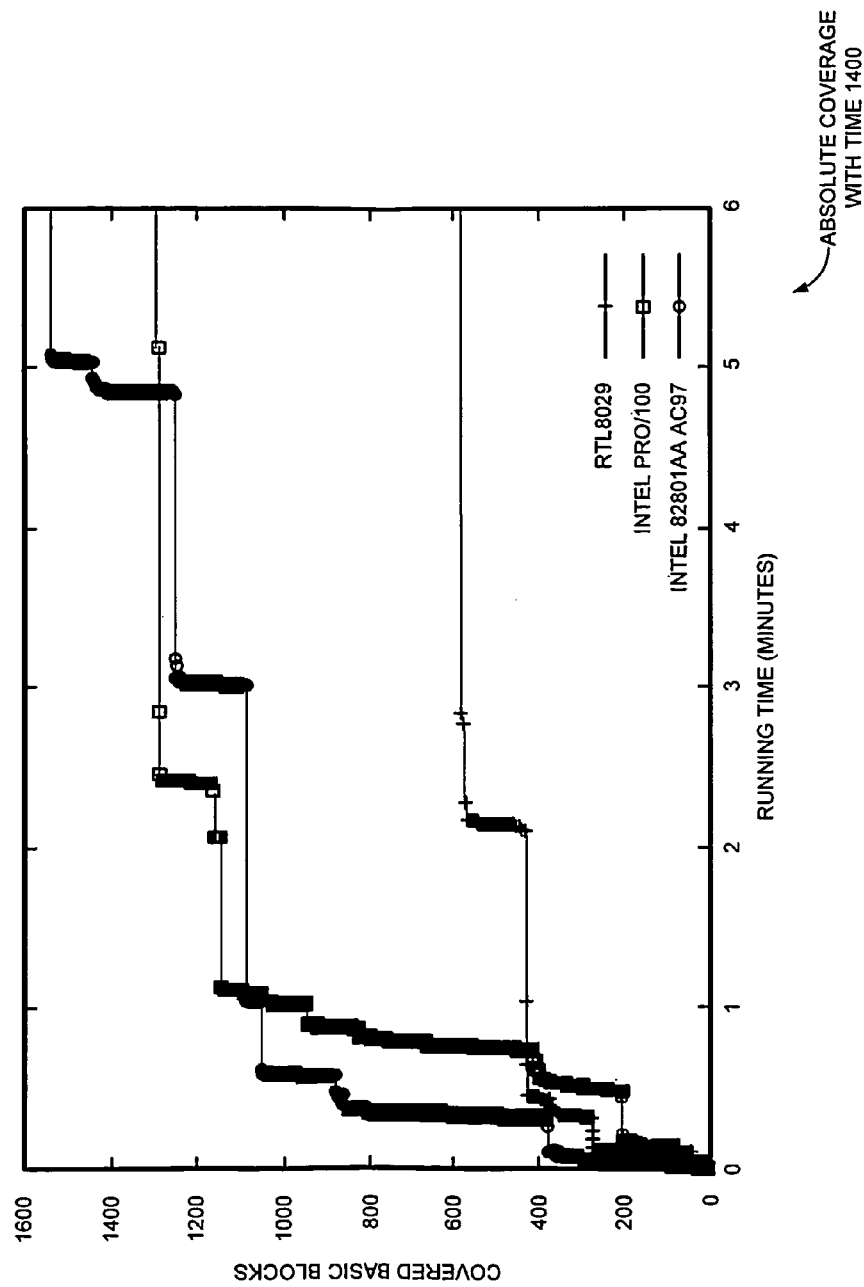
FIG. 14 illustrates a graphical representation of absolute coverage with time, according to one or more embodiments.

DDT was evaluated on drivers ranging from 18 KB to 168 KB. FIG. 13 illustrates how code coverage (as a percentage of total basic blocks) varied with time for a representative subset of the six drivers tested, according to one or more embodiments. FIG. 14 illustrates absolute coverage in terms of number of basic blocks, according to one or more embodiments. DDT was run until no more basic blocks were discovered for some amount of time. In all cases, a small number of minutes were sufficient to find the bugs we reported. For the network drivers, the workload consisted of sending one packet. For the audio drivers, a small sound file was played. DDT's symbolic execution explored paths starting from the exercised entry points. For more complex drivers, workload can be generated with the Device Path Exerciser. DDT has reasonable memory requirements. While testing the drivers in FIG. 11, DDT used at most 4 GB of memory, which is the current prototype's upper limit. The coverage graphs show long flat periods of execution during which no new basic blocks are covered. These periods are delimited by the invocation of new entry points. The explanation is that the driver-loading phase triggers the execution of many new basic blocks, resulting in a first step. Then, more paths are exercised in it, without covering new blocks. Finally, the execution moves to another entry point, and so on. Eventually, no new entry points are exercised, and the curves flatten. Overall, the results show that high coverage of binary drivers can be achieved automatically in just a few minutes. This suggests that DDT can be productively used even by end users on their home machines.

To summarize the disclosure, DDT is a tool for testing closed-source binary device drivers against undesired behaviors, like race conditions, memory errors, and resource leaks, according to one or more embodiments. DDT was evaluated on six mature Windows® drivers and 14 serious bugs were found that can cause a system to freeze or crash. DDT combines virtualization with selective symbolic execution to thoroughly exercise tested drivers, according to one or more embodiments. A set of modular dynamic checkers identify bug conditions and produce detailed, executable traces for every path that leads to a failure. It was shown how traces can be used to provide evidence of the found bugs, as well as help understand these bugs and fix them. DDT does not require access to source code and needs no assistance from users, thus making it widely applicable, according to one or more embodiments. In the future, DDT is seen as being used by IT staff responsible for the reliability and security of desktops and servers, by OS vendors and system integrators, as well as by consumers who wish to avoid running buggy drivers in their operating system kernels.

The method of implementing a binary device driver testing may comprise implementing a virtual machine and a symbolic execution engine to perform a symbolic execution of the binary device driver, executing the binary device driver and injecting a symbolic value, providing a hardware descriptor for a fake device to trick an operating system into loading the binary device driver to be tested, and automatically detecting a plurality of driver entry points of the binary device driver by monitoring attempts of the binary device driver to register the plurality of driver entry points with a kernel, according to one or more embodiments.

The fake device may be an empty shell comprising a descriptor containing a vendor identification, device identification and a resource information. According to one or more embodiments, the machine emulator may be a modified QEMU machine emulator and the symbolic execution engine may be a modified Klee symbolic execution engine.

The back-end of the modified QEMU machine emulator may be extended to generate a LLVM bitcode such that the modified QEMU machine emulator translates a basic block from a guest central processing unit instruction set to a QEMU-specific intermediate representation and then to LLVM, and the LLVM bitcode is directly interpreted by the modified Klee symbolic execution engine, according to one or more embodiments. The modified QEMU machine emulator may run in a loop that repeatedly fetches a guest code block, translates the guest code block, and runs the guest code block in at least one of a host central processing unit and the Klee symbolic execution engine, according to one or more embodiments.

The method of implementing performance analysis of a binary software may comprise implementing a virtual machine and a symbolic execution engine to perform a symbolic execution of the binary software, executing the binary software and injecting one or more symbolic values, providing an emulation of a memory hierarchy, and automatically counting the occurrences of machine events, according to one or more embodiments. The emulated memory hierarchy may combine a plurality of cache levels, size, associativities, and line sizes, according to one or more embodiments. The counted machine events may be at least one of an instruction execution, a cache miss, a TLB miss, and a page fault, according to one or more embodiments.

The counting of occurrences of machine events on a plurality of execution paths through the binary software may indicate an upper bound on the number of such events that may occur during a concrete execution of the software along the plurality of execution paths, according to one or more embodiments. In this scenario, and according to one or more embodiments, the machine emulator may be a modified QEMU machine emulator and the symbolic execution engine may be a modified Klee symbolic execution engine.

The back-end of the modified QEMU machine emulator may be extended to generate a LLVM bitcode such that the modified QEMU machine emulator translates a basic block from a guest central processing unit instruction set to a QEMU-specific intermediate representation and then to LLVM, and the LLVM bitcode is directly interpreted by the modified Klee symbolic execution engine, according to one or more embodiments. The modified QEMU machine emulator may run in a loop that repeatedly fetches a guest code block, translates the guest code block, and runs the guest code block in at least one of a host central processing unit and the Klee symbolic execution engine, according to one or more embodiments.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

FIGS. 1-15 may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 15:
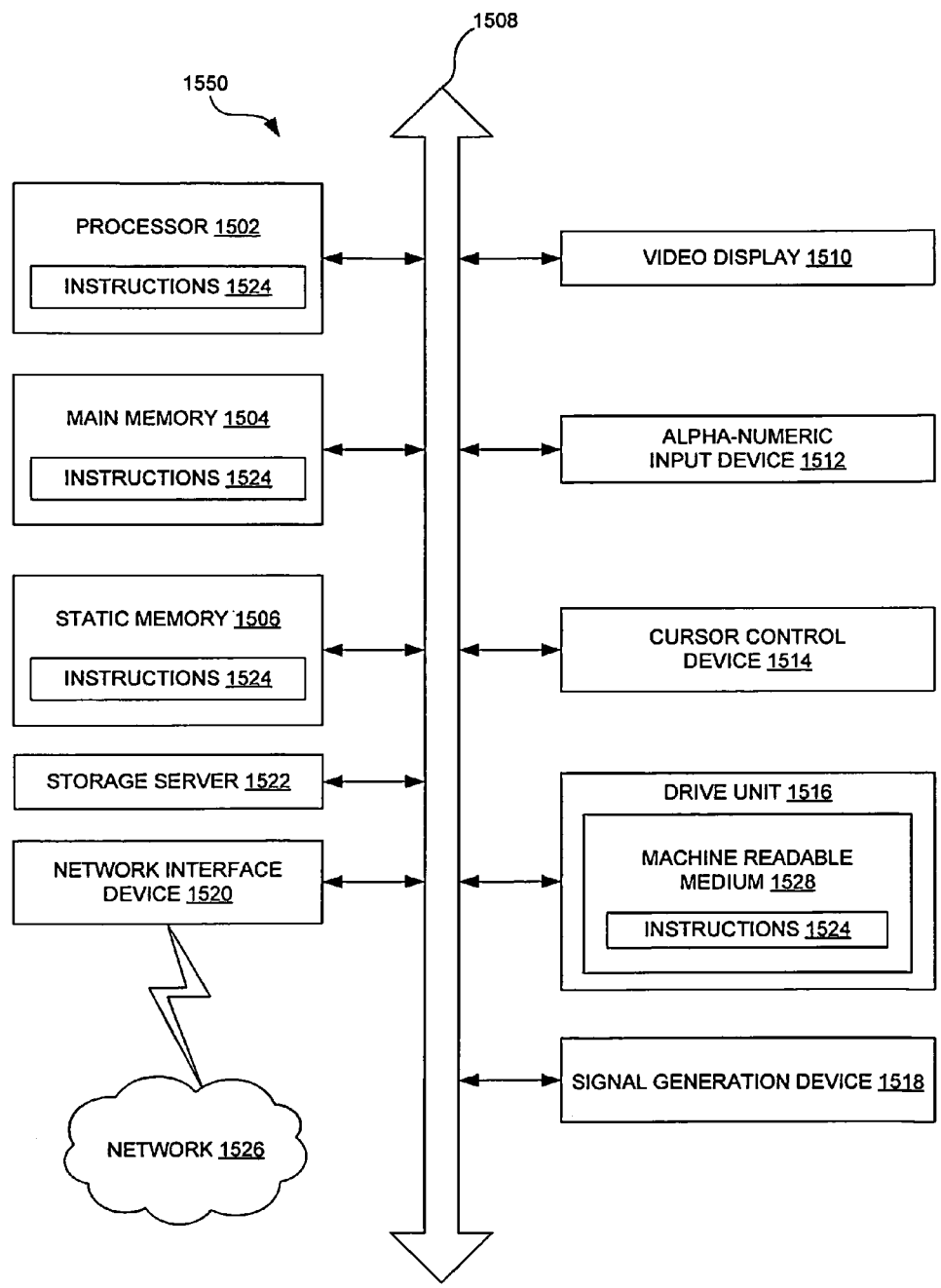
FIG. 15 illustrates a generic computer figure in which the methods and systems of the invention may be implemented, according to one or more embodiments.

FIG. 15 may indicate a personal computer and/or the data processing system in which one or more operations disclosed herein may be performed. The processor 1502 may be a microprocessor, a state machine, an application specific integrated circuit, a field programmable gate array, etc. (e.g., Intel® Pentium® processor, 620 MHz ARM 1176, etc.). The main memory 1504 may be a dynamic random access memory, non-transitory memory and/or a primary memory of a computer system.

The static memory 1506 may be a hard drive, a flash drive, and/or other memory information associated with the data processing system. The bus 1508 may be an interconnection between various circuits and/or structures of the data processing system. The video display 1510 may provide graphical representation of information on the data processing system.

The alpha-numeric input device 1512 may be a keypad, a keyboard, a virtual keypad of a touchscreen and/or any other input device of text (e.g., a special device to aid the physically handicapped).

The cursor control device 1514 may be a pointing device such as a mouse. The drive unit 1516 may be the hard drive, a storage system, and/or other longer term storage subsystem. The signal generation device 1518 may be a bios and/or a functional operating system of the data processing system. The network interface device 1520 may be a device that performs interface functions such as code conversion, protocol conversion and/or buffering required for communication to and from the network 1526. The machine readable medium 1522 may provide instructions on which any of the methods disclosed herein may be performed. The instructions 1524 may provide source code and/or data code to the processor 1502 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system for analysis of a software item, the system comprising:
   one or more computer readable media containing executable instructions for:
      a virtual machine configured to emulate execution of the software item by a target system;
      a symbolic execution engine configured to symbolically execute a portion of the software item; and
      a modular plugin architecture comprising a plurality of plugins configured to implement an in-vivo multipath analysis of the software item; and
   one or more processors for executing the instructions.

2. The system of claim 1, wherein the plurality of plugins comprises at least one selector plugin and at least one analyzer plugin, the at least one selector plugin configured to identify the portion of the software item for symbolic execution, and the at least one analyzer plugin configured to output data describing execution of the software item.

3. A system of analyzing binary software comprising:
   one or more computer readable media containing executable instructions for:
      a symbolic execution engine to perform multi-path analysis of the binary software; and
      an automatic bidirectional data convertor configured to switch between a symbolic value and a concrete value based on an execution consistency model, the automatic bidirectional data convertor being capable to execute at least one of a concrete to symbolic transition and a symbolic to concrete transition, the execution consistency model selected from a plurality of possible execution consistency models that provide different tradeoffs between performance and precision; and
   one or more processors for executing the instructions.

4. The system of claim 3 wherein the symbolic execution engine performs the multi-path analysis of the binary software such that the symbolic execution engine executes and analyses the binary software without modeling the binary software's surrounding environment.

5. The system of claim 3 wherein the symbolic execution engine performs the multi-path analysis of the binary software such that the symbolic execution engine combines elasticity with virtualization by only executing at least one of a library, an operating system kernel, and a plurality of libraries.

6. The system of claim 3 wherein the symbolic execution engine performs the multi-path analysis of the binary software such that the symbolic execution engine combines elasticity with virtualization by executing one portion of the binary software using symbolic execution and another portion of the binary software using virtualization.

7. The system of claim 3 wherein the execution consistency model is at least one of a CFG consistency, an overapproximate consistency, a local consistency, an overconstrained consistency and a strict consistency.

8. The system of claim 7 wherein the local consistency further comprises excluding zero or more execution paths that are incompatible with a contract imposed by an interface between a concrete domain and a symbolic domain.

9. The system of claim 7 wherein the strict consistency further comprises excluding zero or more execution paths that are not consistent with an operation of a concrete domain.

10. The system of claim 7 wherein the overconstrained consistency further comprises only one execution path in a concrete domain for every choice of a representative of an equivalence class of execution paths in a symbolic domain.

11. The system of claim 7 further comprising implementing the overapproximate consistency such that effects of a concrete domain are converted into an unconstrained symbolic data.

12. The system of claim 7 further comprising implementing the strict consistency via an incremental symbolic execution of a concrete domain to preserve execution consistency.

13. A method of analyzing a binary software comprising:
   performing a multi-path analysis of a first portion of the binary software using a symbolic execution of the first portion;
   analyzing a second portion of the binary software using a concrete execution of the second portion within a software system; and
   switching data (crossing an interface between the first portion and the second portion) between a concrete value and a symbolic value according to an annotation that indicates how the switching should be performed.

14. The method of claim 13 further comprising identifying properties of the binary software based on the multi-path analysis.

15. The method of claim 13 further comprising detecting a failure of the binary software along a plurality of execution paths by checking whether the binary software has permission to access a resource region and tracking a plurality of resource regions to determine which resource region was granted to the binary software, which resource region was granted but revoked from the binary software, and which resource region was never granted.

16. The method of claim 15 wherein the resource region comprises at least one of a dynamically allocated memory, a buffer passed to the binary software, a global kernel variable, a binary software stack, an executable image area, a hardware-related memory area and an input/output port range.

17. The method of claim 13 wherein the symbolic execution is initiated responsive to a call to an entry point of the binary software from an operating system kernel or a shell.

18. The method of claim 13 wherein the annotation is at least one of a concrete-to-symbolic conversion hint, a symbolic-to-concrete conversion hint, a resource allocation hint, and a kernel crash handler hook.

19. The method of claim 18 wherein the concrete-to-symbolic conversion hint applies to the binary software's entry point argument and to values returned by a kernel function called by the binary software.

20. The method of claim 18 wherein the symbolic-to-concrete conversion hint specifies an allowed set of values for arguments to a kernel function called by the binary software.

21. The method of claim 18 wherein the resource allocation hint specifies whether at least one of invoking the binary software's entry point and calling the kernel function grants the binary software's access to a resource region.

22. The method of claim 18 wherein the resource allocation hint specifies whether at least one of invoking the binary software's entry point and calling the kernel function revokes the binary software's access to the resource region.

23. The method of claim 13 wherein the symbolic execution comprises producing a symbolic interrupt and producing a symbolic value upon reading from at least one of a symbolic hardware register and DMA memory.

24. The method of claim 13 further comprising producing a collection of traces of a plurality of execution paths leading to failures and producing information to replay the execution paths, thereby allowing for reproduction of the failures on at least one of a virtual machine and a physical machine.

25. The method of claim 13 wherein a simultaneous access to the plurality of execution paths by the symbolic execution enables detection of an infinite loop.

26. The method of claim 13 wherein the multi-path analysis is implemented using a modular plugin architecture.

27. The method of claim 13 further comprising applying a verification tool.

28. The method of claim 13 wherein the switching is performed on-demand such that a symbolic value that is not accessed is not concretized.

29. A method of implementing a binary device driver testing comprising:
   implementing a virtual machine and a symbolic execution engine to perform a symbolic execution of the binary device driver;
   executing the binary device driver and injecting a symbolic value;
   providing a hardware descriptor for a fake device to trick an operating system into loading the binary device driver to be tested; and
   automatically detecting a plurality of driver entry points of the binary device driver by monitoring attempts of the binary device driver to register the plurality of driver entry points with a kernel.

30. The method of claim 29 wherein the fake device is an empty shell comprising a descriptor containing a vendor identification, device identification and a resource information.

31. The method of claim 29 wherein the virtual machine is a modified QEMU machine emulator.

32. The method of claim 31 wherein a back-end of the modified QEMU machine emulator is extended to generate a LLVM bitcode such that the modified QEMU machine emulator translates a basic block from a guest central processing unit instruction set to a QEMU-specific intermediate representation and then to LLVM, and the LLVM bitcode is directly interpreted by the modified Klee symbolic execution engine.

33. The method of claim 32 wherein the modified QEMU machine emulator runs in a loop that repeatedly fetches a guest code block, translates the guest code block, and runs the guest code block in at least one of a host central processing unit and the symbolic execution engine.

34. The method of claim 29 wherein the symbolic execution engine is a modified Klee symbolic execution engine.

35. A method of analyzing performance of a binary software comprising:
   implementing a virtual machine and a symbolic execution engine to perform a symbolic execution of the binary software;
   executing the binary software and injecting one or more symbolic values to explore a plurality of execution paths through the binary software;
   providing an emulation of a memory hierarchy; and
   automatically counting occurrences of machine events to provide a measure of the performance of the binary software along the plurality of execution paths.

36. The method of claim 35 wherein the emulated memory hierarchy combines a plurality of cache levels, size, associativities, and line sizes.

37. The method of claim 35 wherein the counted machine events are at least one of an instruction execution, a cache miss, a TLB miss, and a page fault.

38. The method of claim 35 wherein the counting of occurrences of machine events indicate an upper bound on the number of such events that can occur during a concrete execution of the binary software along the plurality of execution paths.

39. The method of claim 35 wherein the virtual machine is a modified QEMU machine emulator.

40. The method of claim 39 wherein a back-end of the modified QEMU machine emulator is extended to generate a LLVM bitcode such that the modified QEMU machine emulator translates a basic block from a guest central processing unit instruction set to a QEMU-specific intermediate representation and then to LLVM, and the LLVM bitcode is directly interpreted by the symbolic execution engine.

41. The method of claim 39 wherein the modified QEMU machine emulator runs in a loop that repeatedly fetches a guest code block, translates the guest code block, and runs the guest code block in at least one of a host central processing unit and the symbolic execution engine.

42. The method of claim 35 wherein the symbolic execution engine is a modified Klee symbolic execution engine.

* * * * *

UNITED STATES PATENT AND TRADEMARK OFFICE
CERTIFICATE OF CORRECTION

| | | |
|---|---|---|
| PATENT NO. | : 8,776,026 B2 | Page 1 of 1 |
| APPLICATION NO. | : 13/251212 | |
| DATED | : July 8, 2014 | |
| INVENTOR(S) | : George Candea et al. | |

It is certified that error appears in the above-identified patent and that said Letters Patent is hereby corrected as shown below:

In the Claims

Column 44, line 7, after "directly interpreted by the", delete "modified Klee"

Signed and Sealed this
Seventh Day of July, 2015

Michelle K. Lee
*Director of the United States Patent and Trademark Office*